US010558657B1

(12) United States Patent
Cheng et al.

(10) Patent No.: US 10,558,657 B1
(45) Date of Patent: Feb. 11, 2020

(54) DOCUMENT CONTENT ANALYSIS BASED ON TOPIC MODELING

(71) Applicant: Amazon Technologies, Inc., Seattle, WA (US)

(72) Inventors: Weiwei Cheng, Berlin (DE); Christopher Gonzales, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 254 days.

(21) Appl. No.: 15/269,458

(22) Filed: Sep. 19, 2016

(51) Int. Cl.
*G06F 16/00* (2019.01)
*G06F 16/2453* (2019.01)
*G06F 16/93* (2019.01)
*G06F 16/248* (2019.01)

(52) U.S. Cl.
CPC ...... *G06F 16/24535* (2019.01); *G06F 16/248* (2019.01); *G06F 16/93* (2019.01)

(58) Field of Classification Search
CPC ............. G06F 17/2795; G06F 17/2785; G06F 17/30864; G06F 17/30867; G06F 17/3053; G06F 17/30648; G06F 17/30719; G06F 17/30734; G06F 17/30705; G06F 9/4881; G06F 17/30117; G06F 17/3089; G06F 17/30; G06F 9/48; G06F 16/24535; G06F 16/93; G06F 16/248; G06F 16/00; G06F 17/30011; G06F 17/30598; G06F 3/0482
See application file for complete search history.

(56) References Cited

U.S. PATENT DOCUMENTS

| | | | |
|---|---|---|---|
| 6,772,170 B2 | 8/2004 | Pennock et al. | |
| 8,630,975 B1* | 1/2014 | Guo | G06N 7/005 |
| | | | 707/608 |
| 9,135,242 B1* | 9/2015 | Wang | G06F 17/2785 |
| 2003/0097375 A1 | 5/2003 | Pennock et al. | |
| 2006/0179051 A1 | 8/2006 | Whitney et al. | |
| 2007/0050338 A1 | 3/2007 | Strohm et al. | |
| 2010/0125531 A1 | 5/2010 | Wong | |
| 2011/0060983 A1 | 3/2011 | Cai et al. | |
| 2012/0096029 A1 | 4/2012 | Tamura et al. | |
| 2012/0260209 A1 | 10/2012 | Stibel et al. | |
| 2012/0296891 A1* | 11/2012 | Rangan | G06F 17/3069 |
| | | | 707/722 |

(Continued)

OTHER PUBLICATIONS

Office Action for U.S. Appl. No. 15/269,189, dated Jul. 26, 2018, Cheng, "Document Content Analysis Based on Topic Modeling," 21 pages.

*Primary Examiner* — Anh Ly
(74) *Attorney, Agent, or Firm* — Lee & Hayes, P.C.

(57) ABSTRACT

A mechanism for progressive topic modeling is disclosed to facilitate document content analysis. Input documents can be sorted and divided into multiple groups. Topic modeling is performed for each group, where the topic modeling for one group is based on the generated topic model from a previous group, if available. The vocabulary used in the topic modeling process can also be updated for each group of documents. The generated topics can be presented in a user interface to facilitate a user in analyzing the documents. The topic modeling mechanism can also be utilized to enhance a document search experience by generating topics from documents contained in search results and presenting topic words to a user as suggested search terms.

20 Claims, 10 Drawing Sheets

(56) References Cited

U.S. PATENT DOCUMENTS

| | | | |
|---|---|---|---|
| 2013/0097494 A1* | 4/2013 | St. Jacques, Jr. | G06F 16/34 715/273 |
| 2014/0129510 A1* | 5/2014 | Vladislav | G06F 17/30011 706/52 |
| 2014/0207783 A1 | 7/2014 | Ravid | |
| 2015/0046151 A1* | 2/2015 | Lane | G06F 17/2785 704/9 |
| 2015/0046459 A1 | 2/2015 | Ni et al. | |
| 2015/0213361 A1* | 7/2015 | Gamon | G06N 99/005 706/12 |
| 2015/0324454 A1* | 11/2015 | Roberts | G06F 17/3053 707/734 |
| 2016/0034483 A1* | 2/2016 | Ge | G06F 17/3097 706/52 |
| 2016/0103932 A1* | 4/2016 | Sathish | G06F 3/04883 715/767 |
| 2016/0293045 A1 | 10/2016 | Wang et al. | |
| 2016/0306879 A1* | 10/2016 | Logue | F24F 11/30 707/E17.045 |
| 2016/0335345 A1* | 11/2016 | Wang | G06F 16/34 |
| 2017/0011046 A1 | 1/2017 | Kapoor et al. | |
| 2017/0039873 A1 | 2/2017 | Watanabe et al. | |
| 2017/0075991 A1* | 3/2017 | Kataria | G06F 16/358 |
| 2017/0103439 A1* | 4/2017 | Kolb | G06Q 30/0625 707/E17.004 |
| 2017/0103441 A1* | 4/2017 | Kolb | G06Q 30/0627 707/E17.009 |
| 2017/0286540 A1 | 10/2017 | Greenwald et al. | |
| 2017/0330133 A1* | 11/2017 | Liu | G06Q 50/20 |
| 2018/0246883 A1* | 8/2018 | Wang | G06F 17/278 |
| 2018/0336223 A1 | 11/2018 | Kapoor et al. | |

\* cited by examiner

DOCUMENT CONTENT ANALYSIS BASED ON TOPIC MODELING

BACKGROUND

As the Internet and electronic devices have become ubiquitous, an extremely large number of documents are generated every day, such as blogs, comments, news articles, customer reviews of products, etc. For example, WORDPRESS.COM, owned by AUTOMATTIC INC. of San Francisco, California, receives 347 user published blogs every minute, and AMAZON.COM, owned by AMAZON.COM INC. of Seattle, Washington, receives around three-hundred thousand customer reviews of products every day. Many of these documents contain useful information. For example, news articles keep readers informed of the events occurring around the world, while customer reviews of products are not only helpful to customers when making purchase decisions, but can also be helpful to stakeholders such as authors, sellers, product managers, manufacturers in order to analyze and improve products.

The overwhelming number of documents are, however, challenging to analyze. For example, for certain products it might impossible for stakeholders to manually examine all of the product reviews of their products. Tools are therefore needed for automatically analyzing the content of such documents.

Existing tools for analyzing contents are, however, primitive. Most of these tools are based on filtering and sorting. For example, stakeholders can filter customer reviews of their products based on star ratings or particular keywords, or sort customer reviews based on submission dates. These basic functions provide only limited assistance to content analysis. More critically, in order to benefit from these functions, the stakeholders often need to know in advance the topics of the content that they are interested in. This would require the stakeholders to either review the customer reviews at least once to find relevant topics in the content or rely on their previous knowledge about the topics, which might result in missing important topics that were not previously known to the stakeholders.

The disclosure made herein is presented with respect to these and other considerations.

DETAILED DESCRIPTION

Figure 1:
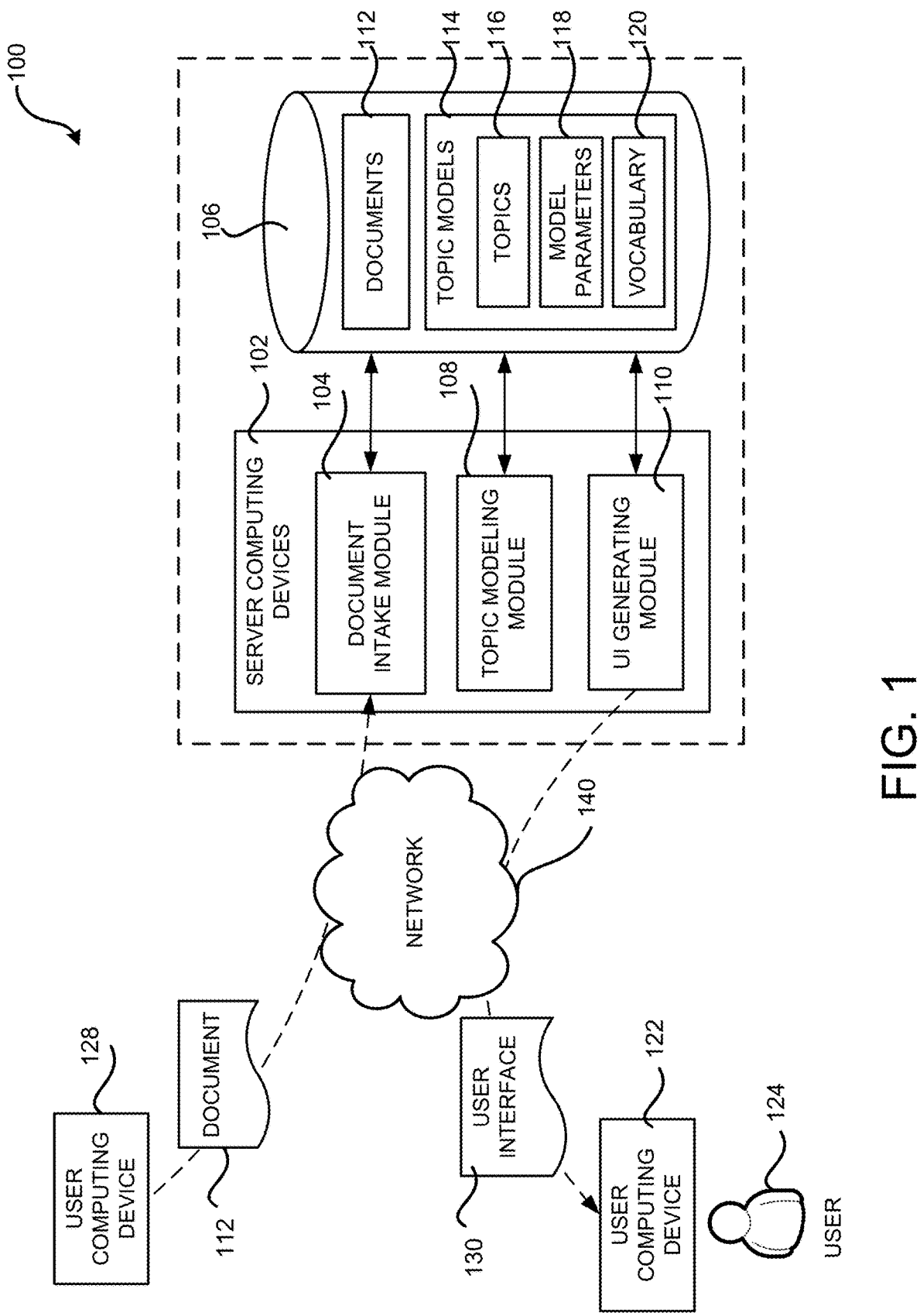
FIG. 1 is a system architecture diagram showing aspects of an illustrative operating environment for technologies for analyzing documents based on topic modeling, according to one configuration disclosed herein.

The following detailed description is directed to technologies for extracting topics from a set of documents utilizing progressive topic modeling and controlled vocabulary to facilitate document content analysis. Through an implementation of the disclosed technologies, topics can be efficiently and effectively extracted from a static or a dynamic set of documents. In progressive topic modeling, topic modeling is performed through multiple stages and a smaller set of document data is processed at each stage of the topic modeling. At the end of each stage, only the topic model at a current stage needs to be stored. Further, a later stage of topic modeling can be built on the topic model obtained in a previous stage, which allows the topic modeling process to converge faster. In addition, the controlled vocabulary mechanism can significantly reduce the number of dimensions in the topic modeling process, thereby significantly reduced the computational complexity of the process.

As can be seen from the above, the progressive topic modeling and the controlled vocabulary mechanism can significantly increase the speed of the topic modeling and generation process while using much less computing and storage resources, such as central processing unit ("CPU") time and memory space, than traditional topic modeling algorithms. In addition, the progressive nature of the disclosed topic modeling mechanism allows efficient topic modeling on a dynamic set of documents. Additional technical benefits other than those described briefly above can also be realized through an implementation of the technologies disclosed herein.

In order to enable the functionality disclosed herein, a topic modeling module is provided to build a topic model for a set of documents and extract topics from these documents. Generally speaking, topics describe hidden semantic structures in the documents. According to one configuration, topic modeling can be implemented through probabilistic topic modeling techniques, such as latent Dirichlet allocation ("LDA"). In this configuration, a topic can be defined mathematically as a distribution over a fixed vocabulary and can be described using words included in the topic and the frequency of each of the words appearing in this topic. A document can have multiple topics. Topics in a document follow a certain topic distribution.

In addition to the topics, a topic model can also include a mathematical framework to capture these topics by utilizing distributions to describe the topic distribution of the documents and word distributions within each topic. For a specific topic modeling technique, such as LDA, the topic distribution and the word distribution are typically assumed to take a certain form. As such, different topic models can be characterized or described using the parameters of their corresponding topic distribution and word distributions. The topic model can further include the vocabulary used during the topic modeling.

To extract topics from documents, the topic modeling module can order the documents according to an attribute associated with the documents, such as the time the documents are created or the categories that the documents belong to. The ordered documents can then be divided into multiple groups and the topic modeling can be performed in multiple stages, one stage for one group of documents. For a first group of documents, a traditional form of topic modeling, such as LDA, can be employed to build the topic model for the documents. The topic model can include topics extracted from the first group of documents, and the corresponding topic and word distribution for the first group of documents described by model parameters. The topic model can be stored for use in the next stage of topic modeling along with the vocabulary used during the topic modeling.

For the second group of documents, or any subsequent group of documents, the topic model obtained from the previous stage can be used as the basis for topic modeling in the current stage. Specifically, the topic modeling in the second stage can start with the first topic model and utilize the second group of documents to further refine estimation of the model parameters for the second topic model. Subsequent groups of documents can be processed in a similar manner.

The progressive topic modeling mechanism presented herein can be utilized to analyze the content of documents to identify topic evolution and to detect trends in the topics. Because the generated topic models are built on top of a previously generated topic model, the topics extracted at different stages have a one-to-one correspondence. This allows a comparative analysis of the extracted topics at different stages to identify how a topic has evolved from the first group to the last group. In addition, the progressive nature of the topic modeling mechanism presented herein enables efficient processing of a dynamic set of documents, where new documents are continuously received.

For example, new customer reviews of products can be received at a merchant system from time to time. Instead of repeating the topic modeling every time new customer reviews are received, the progressive topic modeling mechanism disclosed herein can organize the new customer reviews as a new group of documents and perform topic modeling on the new group of documents based on a previous topic model.

When processing a large number of documents or a dynamic set of documents, the potential vocabulary for topic modeling can be extremely large or even unbounded, which requires a significant amount of computing and storage resources. A controlled vocabulary can be utilized in conjunction with the progressive topic modeling mechanism disclosed herein to limit the size of the vocabulary without reducing the effectiveness of the topic modeling. Because the progressive topic modeling mechanism disclosed herein processes a relatively small number of documents at each stage, the vocabulary used in a stage can be limited to a set of words found in that stage and any previous stages. For a new stage of topic modeling, the vocabulary from the previous stages can be updated to include new words from the new group of documents and to remove words that are no longer predominant in the new group of documents. The topic modeling can then be performed based on the updated vocabulary.

Topics extracted from the documents can be utilized in various applications. For example, the extracted topics can be presented in a user interface to help a user to quickly identify the content and/or to discover patterns of topics covered in the documents. The topics can also be utilized to enhance a search experience. For instance, topic modeling can be performed on documents contained in an initial search result. Words contained in the extracted topics can be presented to a user as a suggestion for query terms.

When the user updates the search query based on the suggested query terms, a new search can be conducted and a new round of topic modeling can be performed on the updated search results to provide more suggestions. In this way, a user can initiate a search with little knowledge about the content of the documents to be searched, but can eventually perform an informed search with the assistance of topic modeling.

It should be noted that the user interface presented herein improves the ability of the computer to display information and interact with the user through the use of topic modeling presentation and configuration. This application solves problems of prior graphical user interfaces in the context of topic model presentation relating to speed, accuracy, usability, and enables the topic models extracted from documents to be presented in a way that is understandable and usable to a user. According to one implementation, the graphical user interface presents a topic section detailing prominent words in the extracted topics adjacent a document section detailing content of documents and their corresponding topic distribution. This particular arrangement and combination of sections allows users to more efficiently and accurately identify the content/topics covered by each document. As such, the user interface improves the ability of the computer to display information and interact with the user. Additional details regarding the various aspects described briefly above will be provided below with regard to FIGS. 1-8.

It should be appreciated that the subject matter presented herein can be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations can be performed in combination with other types of program modules. Generally, program modules include routines, programs, components, data structures, and other types of structures that perform particular tasks or implement particular abstract data types.

Those skilled in the art will also appreciate that aspects of the subject matter described herein can be practiced on or in conjunction with other computer system configurations beyond those described herein, including multiprocessor systems, microprocessor-based or programmable consumer electronics, minicomputers, mainframe computers, hand-held computers, personal digital assistants, e-readers, mobile telephone devices, tablet computing devices, special-purposed hardware devices, network appliances, and the like. The configurations described herein can also be practiced in distributed computing environments, such as a service provider network, where tasks can be performed by remote computing devices that are linked through a communications network. In a distributed computing environment, program modules can be located in both local and remote memory storage devices.

In the following detailed description, references are made to the accompanying drawings that form a part hereof, and that show, by way of illustration, specific configurations or examples. The drawings herein are not drawn to scale. Like numerals represent like elements throughout the several figures (which might be referred to herein as a "FIG." or "FIGS.").

FIG. 1 is a system architecture diagram showing an overview of the configuration and operation of an operating environment 100 presented herein for a mechanism for analyzing documents based on topic modeling, according to one particular configuration. As shown in FIG. 1, a topic modeling module 108 can execute on server computing devices 102. The server computing devices 102 can represent one or more server computers, Web servers, database servers, or network appliances. Alternatively, the server computing devices 102 can represent a user computing device, such as a PC, a desktop workstation, a laptop, a notebook, a mobile device, a PDA, and the like. It will be appreciated that the server computing devices 102 may represent any type of server computer or user computing device known in the art.

The server computing devices 102 can execute a number of modules in order to implement the topic modeling module 108. The modules can execute on a server computing device 102 or in parallel across multiple server computing devices 102. In addition, each module may consist of a number of subcomponents executing on different server computing devices 102. The modules may be implemented as hardware or software executed by hardware.

As briefly discussed above, the topic modeling module 108 can generate topic models 114 for a set of documents 112. The documents 112 can be any type of files that contain text. For example, a document 112 can be a customer review submitted by a consumer of a product, a blog posted by an author, or a news article written by a reporter reporting an event occurred in a certain area. In one configuration, the documents 112 can be received through a document intake module 104 configured to receive documents 112 from document sources, such as from a user computing device 128 through which a customer, an author or a reporter can submit a document 112 to the document intake module 104. The documents 112 can be stored and retrieved from a data store 106 configured to store various data, such as a database or other storage mechanism available to the server computing devices 102.

In the case where the documents 112 are customer reviews, the server computing devices 102 can be application servers having an online shopping module executing thereon that is configured to present items offered for sale by an online merchant. The document intake module 104 can be a module implemented in the online shopping module to provide a review function to allow customers to submit customer reviews 112 of items offered by the online merchant. The customer reviews 112 can include free-form text comments in any format regarding items of any type, including physical products, digital media, services, and the like. In addition, the customer reviews can further include feedback or discussions regarding the customer reviews, comments made regarding other subjects related to the item or collection of items, and/or the like.

As briefly described above, the topic modeling module 108 can be configured to implement progressive topic modeling on the documents 112. Depending on the application, the documents 112 input to the topic modeling module 108 for topic modeling can be customer reviews for a certain type of items, such as the customer reviews for all camera products, if a user is interested in topics discussed generally with regard to camera products. In another scenario, where a seller is more interested in topics discussed in the customer reviews of a specific camera model that the seller has sold, the documents 112 feed into the topic modeling module 108 can include only the customer reviews 112 of cameras of this specific model.

Once the topic modeling module 108 receives the documents 112, the topic modeling module 108 can order or sort the documents 112 according to a certain attribute of the documents 112 based on the goal of the content analysis, such as the creation time of the document 112 or the category of the document 112. For example, if a user is interested in analyzing the change of topics in the customer reviews 112 of a certain product as time goes by, the topic modeling module 108 can order the customer reviews 112 according to the time when they are created or received. In another example, if a seller is interested in the topic changes from highly-rated reviews to low-rated reviews, or vice versa, the customer reviews 112 can be ordered according to the rating contained in the reviews. The ordered or sorted documents 112 can be then divided into groups according to the value of the attribute and/or a pre-determined size of the groups. For example, customer reviews submitted in a same year can be organized into one group. As another example, customer reviews containing the same rating can be placed into one group. As a further example, every 200 customer reviews, or another number, can be placed into one group.

Topic modeling can then be performed on the groups of documents 112 through multiple stages, with one group at one stage. To perform topic modeling, the topic modeling module 108 can employ any probabilistic topic modeling techniques such as latent semantic analysis ("LSA"), probabilistic LSA ("pLSA"), LDA, or other Bayesian generative models for topic modeling.

In one configuration presented herein, LDA is employed for topic modeling. In LDA, for each document 112, the words are assumed to be generated in a two-step process. In the first step, a distribution over topics is randomly chosen for the document. Then, in the second step, for each word in the document, a topic is randomly chosen from the distribution over topics selected at the first step, and a word is randomly chosen from the corresponding topic, which is a distribution over a vocabulary.

In LDA, the distribution over topics and the distribution over the vocabulary are each assumed to follow a multinomial distribution with their respective parameters/variables. This statistical model reflects the intuition that documents exhibit multiple topics: each document exhibits the topics in different proportion, as reflected in the first step, and each word in a document is drawn from one of the topics, where the selected topic is chosen from the per-document distribution over topics, as reflected in the second step.

Note that in the above assumed generation process, only the words in the documents are observable, and all other variables, such as the parameters of the multinomial distributions and the topics contained in the documents, are unobservable. The topic modeling process is thus employed to utilize the observed empirical data, which corresponds to documents 112, to discover the hidden variables, that is, to infer the topic model 114.

The topic model 114 inferred through the topic modeling process disclosed herein can include topics 116 extracted from the documents 112, a set of model parameters 118 describing the mathematical framework of the topic model, such as the parameters for the multinomial distributions, and the vocabulary 120 utilized during the topic modeling. The generated topic model 114 can be stored in the data store 106 along with the documents 112 or can be stored in another storage mechanism separate from the documents 112.

At each stage, the topic modeling module 108 can generate a topic model 114. In the first stage, topic modeling can be performed utilizing the first group of documents 112. The first topic model 114 can be stored in the data store 106 for use in the next stage of topic modeling. For the second group of documents, or any subsequent group of documents, the topic model obtained from the previous stage can be used as the basis for topic modeling in the current stage. Specifically, the topic modeling in the second stage can start with the first topic model 114 and utilize the second group of documents 112 to further refine the estimation of the topics 116 and the model parameters 118 for the second topic model. Subsequent groups of documents 112 can be processed in a similar manner. Additional aspects regarding the progressive topic modeling process described briefly above are provided below with regard to FIG. 2.

It should be noted that when processing a number of documents or a dynamic set of documents, the potential vocabulary 120 for topic modeling can be extremely large or even unbounded, which requires a significant amount of computing and storage resources. A controlled vocabulary mechanism can be utilized in conjunction with the progressive topic modeling process described herein to limit the size of the vocabulary 120 without reducing the effectiveness of the topic modeling.

Because the progressive topic modeling mechanism disclosed herein processes a relatively small number of documents 112 at each stage, the vocabulary 120 used in a stage can be limited to a set of words found in that stage and any previous stages. For a new stage of topic modeling, the vocabulary 120 from the previous stage can be updated to include new words from the new group of documents 112 and to remove words that are no longer predominant in the new group of documents 112. Topic modeling can then be performed based on the updated vocabulary 120. Additional details regarding the use of a controlled vocabulary are provided below with regard to FIGS. 3 and 4.

Topics 116 extracted from the documents 112 can be utilized in various applications. For example, the server computing devices 102 can be configured to execute a user interface ("UI") generating module 110 to generate a user interface 130 to present the extracted topics 116. The user interface 130 can be transmitted over a network 140 to a user computing device 122 to facilitate a user 124 in analyzing the content of the documents 112. In the scenario where the documents 112 are customer reviews 112 of products, the user 124 can be a stakeholder, such as a seller of a product, a product manager, an author of a book, a manufacturer of the product, and the like, who desires to use the customer reviews 112 to analyze and improve their products.

The user computing device 122 can be a personal computer ("PC"), a desktop workstation, a laptop, a notebook, a personal digital assistant ("PDA"), an electronic-book reader, a smartphone, a wearable computing device (such as a smart watch, a smart glass, a virtual reality head-mounted display), a game console, a set-top box, a consumer electronics device, a server computer, or any other computing device capable of connecting to the network 140 and communicating with the server computing devices 102. The network 140 may be a local-area network ("LAN"), a wide-area network ("WAN"), the Internet, or any other networking topology known in the art that connects the user computing device 122 to the server computing devices 102.

The user 124 may use a client application executing on the user computing device 122 to access the user interface 130. According to one embodiment, the client application may be a web browser application, such as the MOZILLA® FIREFOX® web browser from Mozilla Foundation of Mountain View, California. The web browser application exchanges data with the server computing devices 102 using the hypertext transfer protocol ("HTTP") over the network 140. Alternatively, the client application may utilize any number of communication methods known in the art to communicate with the server computing devices 102 across the network 140, including remote procedure calls, SOAP-based web services, remote file access, proprietary client-server architectures, and the like. Additional aspects regarding the user interface 130 are provided below with regard to FIG. 5.

By extracting and presenting topics in a user interface, a user 124 can quickly identify the focus of the documents without going through each document. In addition, topic modeling can also be performed on two or more separate sets of documents and the extracted topics 116 for these sets of documents can be utilized to identify topics that are contained in one set of documents, but not in another set of documents. For example, a manufacturer can perform topic modeling separately on 5-star customer reviews of a product and 1-star customer reviews of this product. Because customers typically discuss product problems in low rated reviews, but not in high rated reviews, the topics extracted from the two sets of customer reviews can be compared and used to identify problems associated with the product.

The topics 116 can also be utilized to enhance a search experience. For example, the user 124, such as a stakeholder, can initiate a search over the documents 112 by submitting a search query to a search engine (not shown in FIG. 1) in order to retrieve documents for analysis purposes. The search engine can return a search result including documents 112 that satisfy the search query. As discussed above, the user 124 might not have enough prior knowledge about the documents 112 to formulate an effective search query. For example, the user 124 might not know the content of the customer reviews without going over the large collection of documents. As such, the returned search result is typically limited by the prior knowledge of the user 124.

Topic modeling can be utilized to improve the search experience in this situation. The topic modeling module 108 can extract topics 116 from the documents 112 contained in the search result. Words contained in the extracted topics 116 can be presented to the user 124 in a user interface 130 as suggested query terms. The user 124 can select one or more of the suggested query terms and request a new search. Once the updated search result is returned, another round of topic modeling can be performed on the updated search result to provide more suggested query terms based on the extracted topics 116. In this way, the user 124 can discover additional topics that are discussed in the documents 112 but that were unknown to him/her when the first search was initiated. Additional details regarding the mechanism disclosed herein for utilizing topic modeling to enhance a search experience are provided below with regard to FIGS. 6 and 7.

Figure 2:
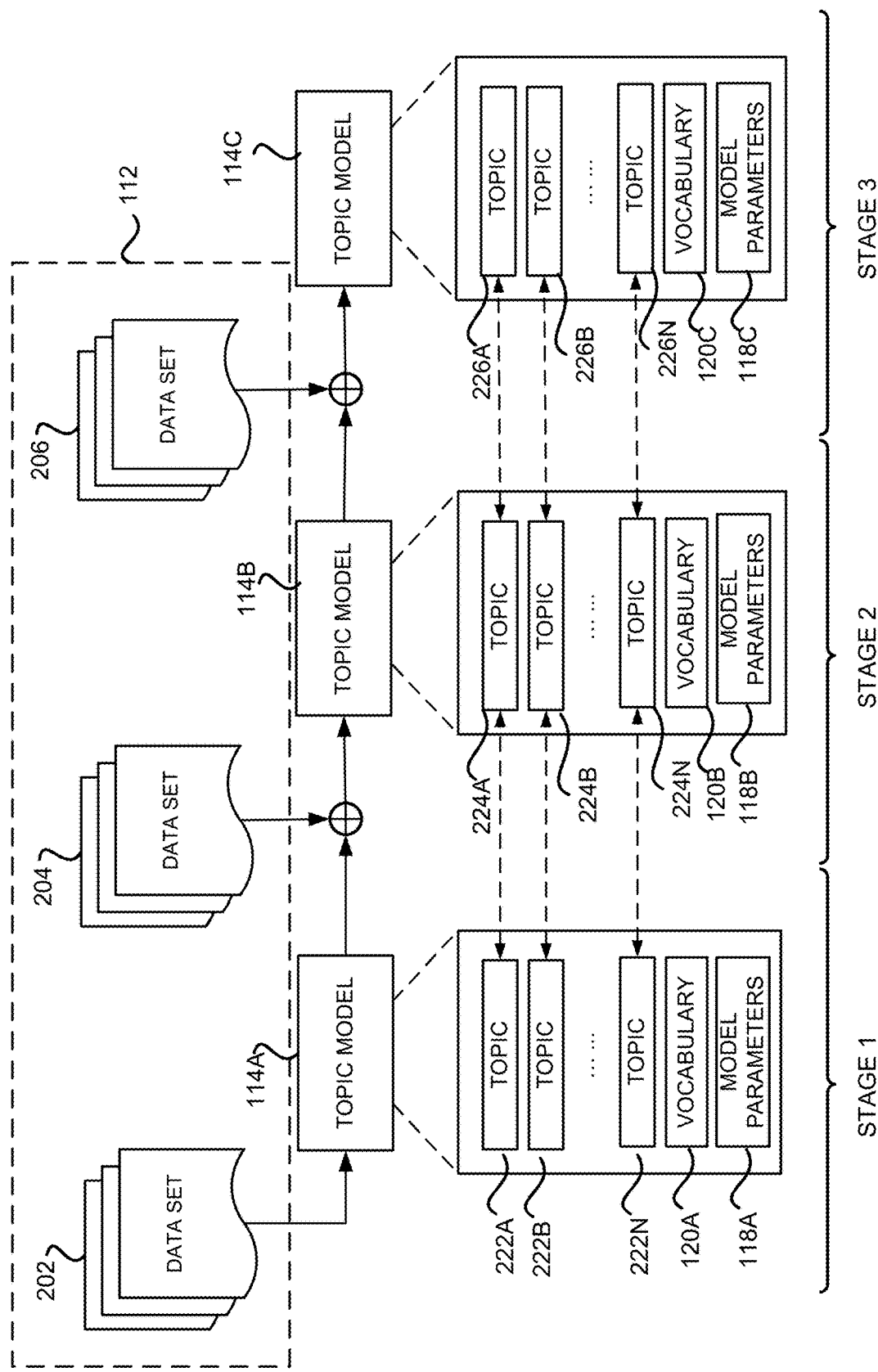
FIG. 2 is a block diagram showing aspects of an illustrative process for generating topic models from document data based on progressive topic modeling, according to one configuration disclosed herein.

FIG. 2 is a block diagram showing aspects of an illustrative process for generating topic models from documents 112 via progressive topic modeling, according to one configuration disclosed herein. In FIG. 2, the documents 112 are divided into three groups: data set 202; data set 204; and data set 206. As discussed above, the grouping can be made according to a value of an attribute associated with the documents 112. For customer review documents 112, the grouping can be based on the time the customer reviews are submitted or the ratings provided in the customer reviews. For a dynamic set of documents 112, where new documents 112 are continuously received, the grouping can be made based on the time the documents 112 are received.

The first model 114A can be built through topic modeling based on the data set 202 over vocabulary 120A. The generated model 114A can include a set of topics 222A-222N that are included in the data set 202. The number of generated topics can be set as a parameter for use during topic modeling so that a desired number of topics are extracted from the documents 112. The topic modeling can also output the estimated model parameters 118A, such as the hidden variables for the distribution over topics and the distribution over vocabulary 120A. At the next stage, the data set 204 can be obtained. For a dynamic set of documents 112, the data set 204 can include the new documents received after the model 114A is built. The topic modeling module 108 can then perform topic modeling on the data set 204.

In some configurations, the vocabulary 120A used in the first stage topic modeling can be updated to take into account the documents 112 included in the data set 204. The updated vocabulary 120B can then be utilized in the topic modeling. Different from the topic modeling performed at the first stage, the topic modeling over data set 204 can be built based on model 114A, where the documents 112 in the data set 204 can be utilized to further refine the model parameters 118A estimated in the first stage and to update the topics 222A-222N to generate a new model 114B, which includes the model parameters 118B and the topics 224A-224N.

It should be understood that if the updated vocabulary 120B is different from the vocabulary 120A used in building the model 114A, the model 114A need to be updated before the topic modeling over the data set 204 is performed. For example, if some words in the vocabulary 120A have been removed from the vocabulary 120B, the model parameters 118A that describe the distribution over the vocabulary 120A need to be updated to reflect the new vocabulary 120B.

Similarly, for data set 206, the topic modeling module 108 can first update the vocabulary 120B based on the documents 112 in the data set 206 and adjust the model parameters 118B accordingly. Topic modeling can then be performed over data set 206 based on the topic model 114B to further refine the model parameters 118B and the topics 224A-224N. The generated model 114C would include the new topics 226A-226N and the new model parameters 118C. The updated vocabulary 120C can also be included in the model 114C. Additional aspects regarding usage of a controlled vocabulary are provided below with regard to FIG. 3.

It should be appreciated that at any given stage, only the most recent model needs to be stored in the data store 106. Any models 114 generated earlier than the most recent model can be discarded. Further, the controlled vocabulary mechanism can ensure that the size of the vocabulary at any stage of topic modeling can be limited to a smaller number than that in a traditional topic modeling method. As such, the storage consumption of the progressive topic modeling presented herein is smaller. In addition, because the progressive topic modeling mechanism presented herein can process new documents 112 without repeating the topic modeling on the entire collection of documents 112, significant amount of computing resources, such as CPU time, can be saved.

It should be further appreciated that because the topic models built at later stages are based on the topic model generated in a previous stage, the topics in the topic model at different stages can have a one-to-one correspondence. For example, the topics 222A, 224A and 226A shown in FIG. 2 correspond to the same topic. Similarly, topics 222B, 224B and 226B are also correspond to the same topic. The one-to-one correspondence among the extracted topics at different stages allow a user 124 to analyze the evolution of topics from an earlier stage to a later stage and/or to detect trends such as sentiment change.

Table 1 illustrates the result of applying the progressive topic modeling to customer reviews of personal care appliance products. There are around 9800 customer reviews in total. These customer reviews are sorted based upon their ratings (e.g. from 5 stars to 1 star) and the group size is selected to be 200 reviews. As a result, there are a total of 49 groups of customer reviews.

Table 1 shows the extracted topics for the first group, i.e. reviews 0-200, and the $6^{th}$ group, i.e. reviews 1000-1200. Both these two groups of customer reviews are 5-star reviews, and thus the extracted topics contain many positive words. Table 1 also shows the topics for the last group, i.e. reviews 9600-9800, which consist of only 1-star reviews. The topic modeling algorithm is set to output five topics for each group of customer reviews. For each of the generated topics, the most frequent ten words are shown in Table 1 and the subscripts represent the frequency of the word. Words indicating sentiments are underlined.

TABLE 1

Topics generated on customer reviews of personal care appliances

| Topic No. | Topics on reviews 0-200 ($1^{st}$ group) | Topics on reviews 1000-1200 ($6^{th}$ group) | Topics on reviews 9600-9800 (last group) |
|---|---|---|---|
| 1 | $product_{22}$ $gift_{15}$ $works_{14}$ $\underline{loves}_{11}$ $expected_9$ $shipping_8$ $exactly_7$ $price_7$ $\underline{fine}_5$ $\underline{recommend}_5$ | $product_{22}$ $\underline{recommend}_{11}$ $works_{10}$ $quality_9$ $arrive_8$ $gift_8$ $needed_8$ $shipping_8$ $quickly_7$ $price_6$ | $scale_6$ $weight_6$ $\underline{accurate}_6$ $small_5$ $thing_5$ $meter_4$ $picture_4$ $\underline{slippery}_4$ $hard_4$ $strips4$ |
| 2 | $product_{36}$ $\underline{recommend}_{16}$ $\underline{accurate}_{14}$ $review_{14}$ $weight_{11}$ $quality_{11}$ $scale_{11}$ $water_{10}$ $rate_{10}$ $able_9$ | $scale_{22}$ $product_{17}$ $\underline{love}_{15}$ $\underline{accurate}_{13}$ $\underline{easy}_{11}$ $price_{10}$ $received_{10}$ $item_{10}$ $device_8$ $weight_8$ | $product_{58}$ $working_{32}$ $buy_{27}$ $return_{27}$ $money_{26}$ $bought_{26}$ $unit_{25}$ $item_{23}$ $\underline{disappointed}_{21}$ $\underline{stopped}_{21}$ |
| 3 | $\underline{love}_{23}$ $product_{19}$ $\underline{easy}_{17}$ $pressure_{16}$ $bought_{12}$ $\underline{happy}_{11}$ $\underline{perfect}_{10}$ $family_{10}$ $purchase_9$ $help_9$ | $product_{15}$ $works_{13}$ $\underline{happy}_{10}$ $bought_9$ $shower_8$ $buy_8$ $hair_8$ $eyes_8$ $\underline{love}_7$ $thing_7$ | $clipper_{12}$ $hair_8$ $money_8$ $cut_7$ $quality_7$ $wear_6$ $stay_5$ $blades_5$ $watch_5$ $worth_4$ |
| 4 | $brush_{33}$ $toothbrush_{30}$ $teeth_{22}$ $battery_{13}$ $brushing_{12}$ $5000_{10}$ $app_9$ $electric_9$ $clean_8$ $comes_8$ | $toothbrush_{23}$ $teeth_{17}$ $product_{15}$ $razor_{15}$ $shaver_{12}$ $cleaning_{12}$ $\underline{love}_{10}$ $works_9$ $\underline{recommend}_8$ $battery_8$ | $months_{10}$ $brush_{10}$ $water_9$ $mist_8$ $door_6$ $working_6$ $\underline{broke}_5$ $design_4$ $\underline{broken}_4$ $\underline{waste}_4$ |
| 5 | $works_{19}$ $nice_{12}$ $shaver_{11}$ $service_9$ $quality_9$ $fast_9$ $\underline{love}_9$ $shave_8$ $price_7$ $early_5$ | $product_{16}$ $skin_9$ $lot_6$ $legs_6$ $humidifier_5$ $machine_5$ $big_5$ $light_5$ $difference_5$ $apartment_5$ | $product_{10}$ $pas_8$ $box_7$ $pads_6$ $razor_5$ $floss_5$ $diffuser_5$ $est_5$ $fell_5$ $mon_5$ |

As can be seen from Table 1, for the same topic, such as topic 2, positive words like "love" and "recommend" previously shown for the $1^{st}$ and $5^{th}$ groups disappear in the last group, and are replaced with negative words like "disappointed" and "return." The one-to-one correspondence of topics extracted at different stages enables a user 124 to observe this kind of topic evolution, which is impossible if topic modeling is performed independently on the different groups of documents. Further, topic 5 of the last group shown in Table 1 shows that the disclosed mechanism for topic modeling is able to detect reviews that are written in a different language and group them into one topic.

Figure 3:
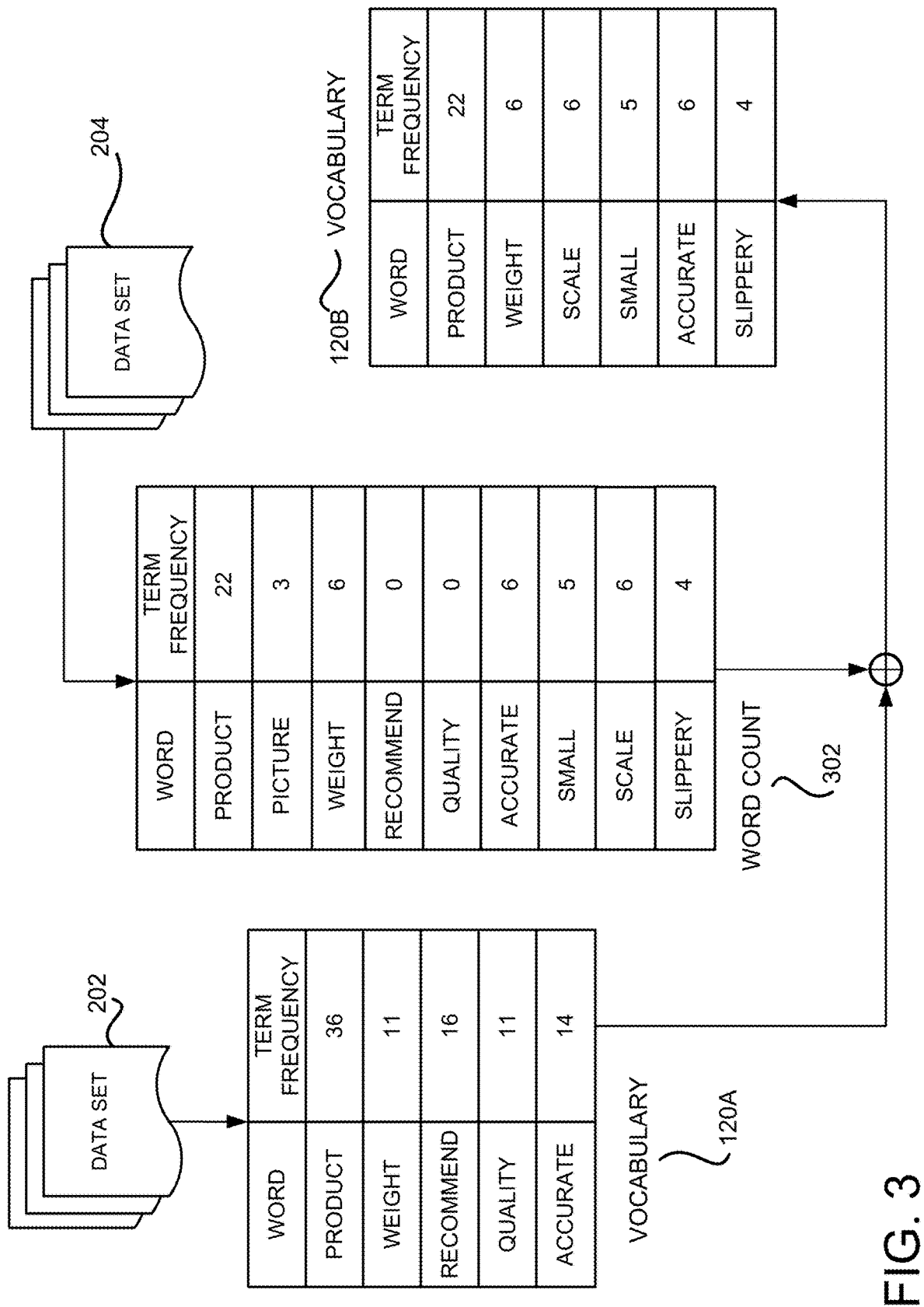
FIG. 3 is a diagram showing one example of controlling vocabulary during progressive topic modeling, according to one configuration disclosed herein.

FIG. 3 illustrates an example showing the process of using controlled vocabulary in progressive topic modeling, according to one configuration disclosed herein. As discussed above, typically a vocabulary used in topic modeling should include all or most of the words appearing in the documents 112. This poses a challenge when the size of documents becomes large, because a large vocabulary requires a significant amount of computing and storage resources. When the documents are a dynamic set of documents, where new documents 112 are added constantly, the potential vocabulary can become unbounded. A controlled vocabulary can be employed to address this issue by reducing the size of the vocabulary at each stage of progressive topic modeling.

As shown in FIG. 3, the vocabulary 120A used in the topic modeling for the data set 202 can be limited to a smaller size to include only words appearing in the documents 112 in the data set 202, such as "product," "weight" "recommend," "accurate" and "quality." When the data set 204 is obtained to build the topic model 114B, the vocabulary 120A needs to be updated to take the new documents in the data set 204 into account. In one configuration, the update can be performed by removing from the vocabulary 120A words that appear less than a pre-defined frequency threshold, and add those that appear more than the threshold.

As shown in FIG. 3, when the data set 204 is obtained or otherwise becomes available to be processed, raw word counts 302 can be calculated for the documents contained in the data set 204. Based on the raw data counts 302, a new vocabulary 120B can be generated by removing from the previous vocabulary 120A words that have a frequency less than the frequency threshold, which is set at 4 in the example shown in FIG. 3. The removed words would include "recommend" and "quality." In the meantime, the new vocabulary 120B can also include new words appearing in the data set 204 and having a frequency higher than or equal to the threshold 4. This leads to the words "scale," "small" and "slippery" to be added to the vocabulary 120B shown in FIG. 3.

The controlled vocabulary mechanism described above can ensure that each stage of topic modeling uses a vocabulary that is up to date and has a tightly bounded size, thereby leading to a topic model with a high accuracy and a small size. It should be further appreciated that the vocabulary updating method shown in FIG. 3 is for illustration only, and should not be considered as limiting. Various other ways of updating the vocabulary can be utilized.

For example, instead of solely relying on the word counts in the new documents, a weighted count can be employed to include the word counts from the previous vocabulary. The weight distribution can be used to reflect the importance of the old documents versus the new documents. For instance, the word counts for the new documents can be assigned a weight of 0.8 and that of the old documents can be assigned a weight of 0.2 to ensure that older data still has an impact. Further, during the vocabulary update, a record can be maintained to identify the words removed from the old vocabulary 120A. This record can be utilized later to update the corresponding topic model 114A so that the next stage of topic modeling can be performed based on the topic model 114A over the updated vocabulary 120B.

Figure 4:
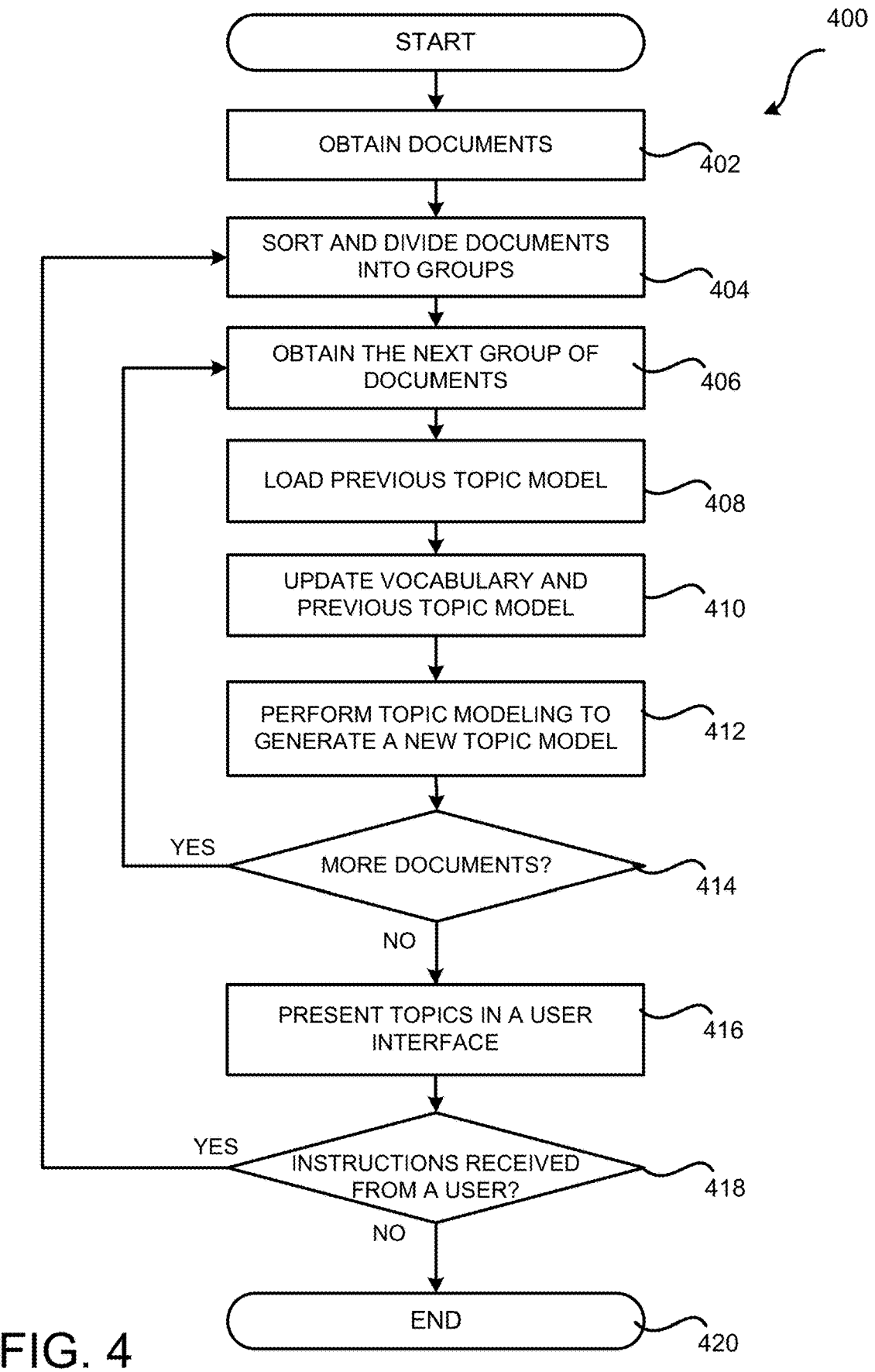
FIG. 4 is a flow diagram showing a routine that illustrates a method of generating topic models from documents via progressive topic modeling, according to one particular configuration disclosed herein.

FIG. 4 is a flow diagram showing a routine 400 that illustrates a method of generating topic models from documents via progressive topic modeling, according to one particular configuration disclosed herein. It should be appreciated that the logical operations described herein with respect to FIG. 4, and the other FIGS., can be implemented (1) as a sequence of computer-implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special-purpose digital logic, and any combination thereof. It should also be appreciated that more or fewer operations can be performed than shown in the FIGS. and described herein. These operations can also be performed in parallel, or in a different order than those described herein. Some or all of these operations can also be performed by components other than those specifically identified.

The routine 400 begins at operation 402, where a collection of documents 112 are obtained. As discussed above, the documents can be customer reviews submitted by consumers of products or services, blogs posted by blog authors, or news articles written by reporters reporting events occurred in certain areas. From operation 402, the routine 400 proceeds to operation 404, where the topic modeling module 108 can divide the documents 112 into several groups. This partitioning can be performed by ordering the documents 112 according to an attribute associated with the documents and then organizing the ordered documents 112 into different groups. Depending on the goal of the content analysis, the documents can be ordered according to the time the documents 112 are submitted or the category of the documents 112 belong to. For example, if the documents include customer reviews of products, these customer reviews can be classified into different categories based on the quantitative rating provided by the customer reviews, such as a 5-star rated customer review, or 3-star rated customer reviews. The grouping can then be based on the rating of the customer reviews. For a dynamic set of documents, where new documents 112 are continuously received, the grouping can be performed based on the time the documents are received.

It should be understood that the documents 112 can also be ordered and partitioned into groups based on a combination of multiple attributes of the documents 112. For instance, the documents 112 can be ordered first according to their categories, and then within each category, the documents 112 can be ordered according to the time the documents 112 are submitted. The grouping can be conducted by placing a fixed number of documents in each group, such as every 200 reviews forming one group, or by placing documents having a common value of an attribute or a combination of attributes into one group, such as placing customer reviews submitted within a same calendar year into one group.

From operation 404, the routine 400 proceeds to operation 406, where the topic modeling module 108 obtains a next group of documents 112 to be processed for topic modeling. The routine 400 then proceeds to operation 408, where a previously built topic model 114 is loaded. If the current group of documents 112 is the first group, the previous topic model 114 would be empty.

The routine 400 then proceeds to operation 410, where the vocabulary 120 used in the previous topic model can be updated based on the words appearing in the current group of documents 112. In one configuration, the controlled vocabulary mechanism described above with regard to FIG. 3 can be employed to update the vocabulary 120, where words that appear less than a pre-defined frequency threshold can be removed from the vocabulary 120, and words that appear more than the threshold in the current group of documents 112 can be added to the vocabulary 120. For the first group of documents 112, the previous vocabulary 120 would be empty, and the vocabulary 120 can be built by including words that appear in the first group of documents more than the frequency threshold.

As discussed above, once the vocabulary 120 is updated, the topic model 114 built based on the vocabulary 120 can also be updated in order for the topic model 114 to be utilized in the next stage of topic modeling. Updating the topic model 114 can include updating the mathematical framework of the topic model, i.e. the distribution over topic and the distribution over the vocabulary. Since the vocabulary 120 has changed, the distributions over the vocabulary 120 and their model parameters 118 can be updated accordingly.

From operation 410, the routine 400 proceeds to operation 412, where topic modeling is performed utilizing the current group of documents 112 and based on the previous topic model 114, if available. In one configuration, the topic modeling can be performed utilizing LDA. As briefly described above, LDA assumes words in the documents 112 are generated in a two-step process. In the first step, a distribution over topics are randomly chosen for the document. Then in the second step, for each word in the document, a topic is randomly chosen from the distribution over topics selected at the first step, and a word is randomly chosen from the corresponding topic, which is a distribution over a vocabulary. In LDA, the distribution over topics and the distribution over the vocabulary are each assumed to follow a multinomial distribution with their respective parameters/variables.

The generative process of LDA can be mathematically described using the following joint distribution:

$$p(\beta_{1:K}, \theta_{1:D}, z_{1:D}, w_{1:D}) = \left(\prod_{i=1}^{K} p(\beta_i)\right)\left(\prod_{d=1}^{D} p(\theta_d) \prod_{n=1}^{N} p(z_{d,n} | \theta_d) p(w_{d,n} | \beta_{1:K}, z_{d,n})\right). \quad (1)$$

Here, $\beta_{1:k}$ are the topics 116 and there are K topics in total, where each $\beta_k$ with $1 \leq k \leq K$ is a distribution over the vocabulary 120. The topic proportions for the $d^{th}$ document out of a total of D documents are $\theta_d$ with $1 \leq d \leq D$, where $\theta_{d,k}$ is the topic proportion for topic k in document d. $z_d$ are the topic assignments for the $d^{th}$ document, where $z_{d,n}$ is the topic assignment for the $n^{th}$ word in the document d and $1 \leq n \leq N$ with N being the number of words in a document. $w_d$ are the observed words for document d, where $w_{d,n}$ is the nth word in document d, which is an element of the vocabulary 120.

Based on the above assumption, topic modeling can be considered as a process that utilizes the observed empirical data, which corresponds to documents 112, to discover the hidden variables of the involved distributions, that is, to infer the topic model 114. The topic model 114 can include the topics $\beta_{1:K}$ 116, and the topic proportion $\theta_{1:D}$ and topic assignment $z_{1:D}$, which can be represented by the model parameters 116. This inference process corresponds to the computation of the posterior probability:

$$p(\beta_{1:K}, \theta_{1:D}, z_{1:D} | w_{1:D}) = \frac{p(\beta_{1:K}, \theta_{1:D}, z_{1:D}, w_{1:D})}{p(w_{1:D})}, \quad (2)$$

which can be understood as the conditional distribution of the topic structure given the observed documents 112.

Since the number of possible topic structures is exponentially large and the marginal probability of the evidence $p(w_{1:D})$ is not directly computable, sampling-based algorithms can be used to approximate the posterior distribution. In one configuration, Gibbs sampling can be used to approximate the posterior probability. In Gibbs sampling, a Markov chain can be built, which is a sequence of random variables, each dependent on the previous variable and whose limiting distribution is the posterior distribution of Eqn. (2). The Markov chain can be defined on the hidden model variables/parameters 118 for the group of documents 112, and the algorithm can run the Markov chain for a period of time, collect samples from the limiting distribution, and then approximate the distribution with the collected samples.

When a topic model 114 from a previous stage is available, the inference can be made based on the knowledge of the previous topic model 114 to speed up the process. For example, the Markov chain can be defined utilizing the model parameters 118 as a basis, which would reduce the number of iterations involved in running the Markov chain, thereby reducing the time and resources spent on the topic modeling.

From operation 412, the routine 400 proceeds to operation 414, where a determination is made as to whether there are more documents 112 to be processed. If so, the routine 400 returns to operation 406, where the next group of documents 112 can be retrieved for processing. The routine 400 then repeats operations 408-414 until all the groups of documents are processed.

If, at operation 414, it is determined that no additional documents 112 need to be processed, the routine 400 proceeds to operation 416, where the generated topics 116 can be presented to a user 124 in a user interface 130. Additional aspects regarding the user interface 130 presenting the topics 116 are provided below with regard to FIG. 5. From operation 416, the routine 400 proceeds to operation 418, where a determination can be made as to whether instructions to modify the topic modeling have been received from the user 124, for example, through the user interface 130. The user interface 130 can be configured to provide the functionalities that allow the user 124 to change the size of the group, to specify the number of iterations in the topic modeling process, to add or delete stop words, or to change other aspects of the topic modeling. If it is determined that the user 124 has sent instructions to modify the topic modeling, the routine 400 proceeds to operation 404, where the topic modeling is repeated based on the received user instructions. If it is determined at operation 418 that no instructions are received from the user 124, the routine 400 proceeds to operation 420, where it ends.

Figure 5A:
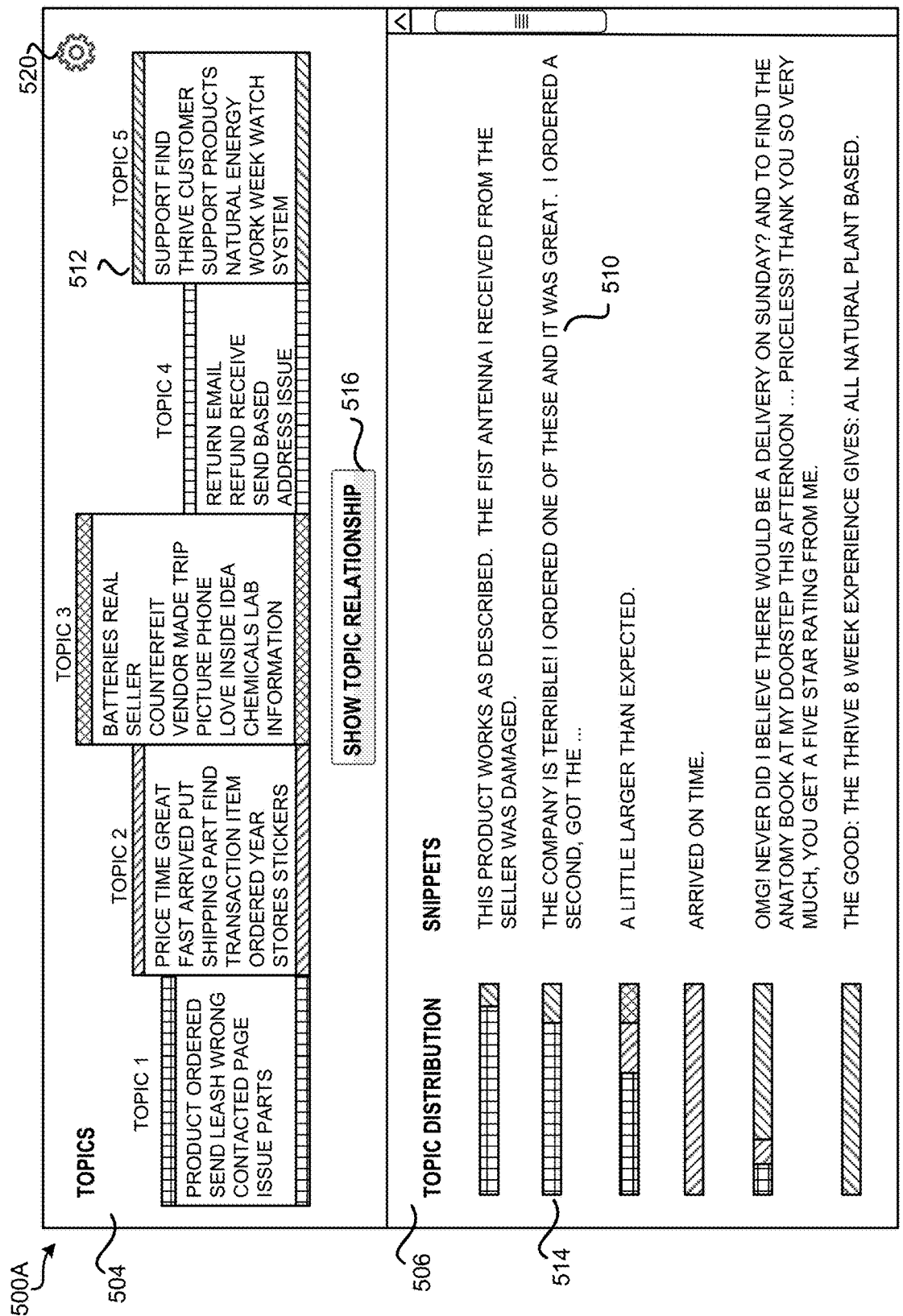
FIGS. 5A-5C are screen diagrams showing exemplary user interfaces for presenting topics extracted from documents, according to one configuration disclosed herein.
Figure 5B:
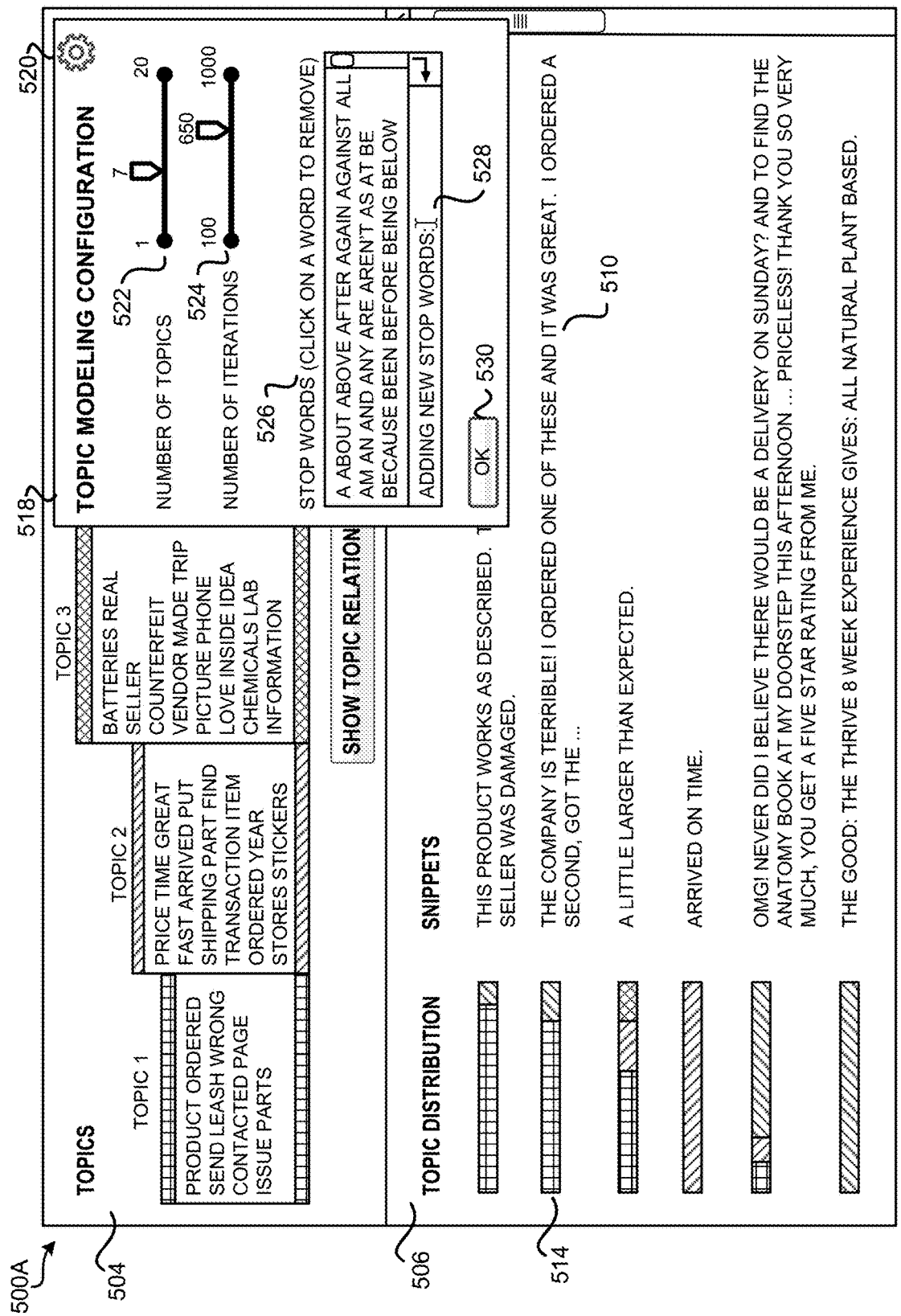
Figure 5C:
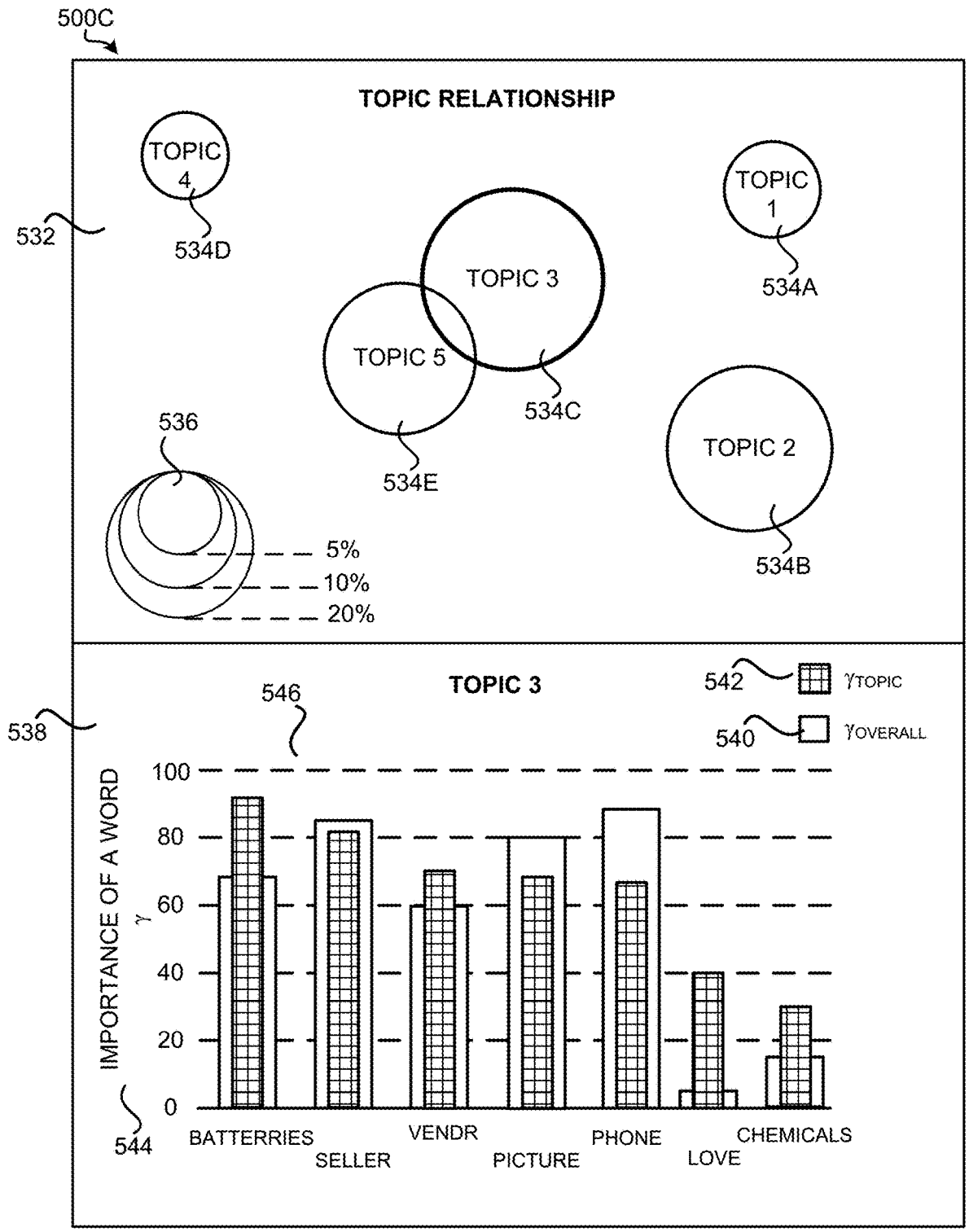

FIGS. 5A-5C are screen diagrams showing exemplary user interfaces ("UIs") 500A and 500C for presenting topics 116 extracted from documents 112, according to one configuration disclosed herein. It should be understood that the topics 116 presented in FIGS. 5A-5C can be generated by the progressive topic modeling mechanism presented herein, or any other topic modeling algorithms, such as traditional LDA. In one implementation, the UIs 500A and 500C can be sent by the UI generating model 110 as a Web page to be rendered in a window 502 by the client application executing on the user computing device 122, as described above in regard to FIG. 1.

The UI 500A includes a topic panel 504, where topics 116 generated from the documents 112 can be presented. In the topic panel 504, each topic 116 is represented by its most frequent words, and is displayed inside a topic box 512. The background pattern or the color of the topic box 512 can be utilized to distinguish different topics 116. The height of the topic box 512 indicates the overall topic proportion for the corresponding topic over the entire collection of the documents 112. Under the mathematical framework described above, the overall topic proportion for topic k can be defined as $$\sum_{d=1}^{D} \theta_{d,k}.$$

In this definition, each document is treated equally and the weights for the documents are the same. It should be noted that the overall topic proportion for a topic can be defined in other ways. For example, words can be treated equally, which would lead to a topic proportion definition where a longer document can have a higher weight because they have more words.

The UI 500A can also include a document panel 506, where individual documents 112 can be displayed. In one implementation, a snippet 510 of each document 112 can be displayed in the document panel 506, and the complete document 112 can be displayed when the corresponding snippet 510 is selected or clicked on. The document panel 506 can be displayed when a topic box 512 shown in the topic panel 504 is clicked or selected.

The documents 112 shown in the document panel 506 can be sorted according to their respective membership to the selected topic 116. For example, a document whose topic proportion has the selected topic as the most frequent topic can be displayed at the top of the display panel 506.

In the UI 500A shown in FIG. 5A, each of the document snippets 510 shown in the document panel 506 can have a distribution bar 514 associated therewith to illustrate the topic proportion for the corresponding document 112. The distribution bar 514 can include multiple segments, each segment representing a topic that is contained in the document 112. The pattern or the color of the segment can match the background pattern or color of the corresponding topic box 512. The length of the segment represents the portion of the corresponding topic in the document 112.

The UI 500A can further include a configuration button 520 configured to provide the functionalities that allow a user 124 to change the configuration of the topic modeling process. FIG. 5B shows an exemplary topic modeling configuration window 518 that can be shown when the configuration button 520 is activated. The configuration window 518 can include a user interface control 522 configured to allow the user to set the number of topics to be output by the topic modeling process. The user interface control 522 can be a sliding bar representing a certain range for the number of topics that can be output. The user can select a specific location on the sliding bar to set the desired number of output topics.

Similarly, the configuration window 518 can also include a user interface control 524 to allow the user to set the number of iterations for the topic modeling process. A sliding bar can also be used to represent a feasible range for the number of iterations and the user can select a specific location of the sliding bar to set the desired number of iterations. It should be noted that a higher number of iterations can result in a longer time for the topic modeling process to complete, whereas a lower number of iterations can lead to a shorter time to finish the topic modeling, but with a lower accuracy. Since the number of iterations affects the quality of topic modeling, only advanced users are allowed to change this parameter in one implementation.

The configuration window 518 can also be configured to include a stop word field 526 where a user can add or remove stop words. Stop words include words that are filtered out before the topic modeling starts. In other words, stop words include words that will not appear in the topics. A user can add a stop word by typing the word in the text field 528. The text filed 528 can also be configured to allow multiple stop words be added at the same time, for example, by separating the multiple stop words by a space or a comma. An existing stop word can be removed by a user clicking on the word in the stop word field 526. Once the user finishes the configuration of the topic modeling, he or she can click on the button 530 to acknowledge the changes and to close the configuration window 518. The topic modeling module 108 can then perform topic modeling based on the updated topic modeling configuration to generate updated topic models. The topics of the updated topic models can then be shown in the UI 500A as described above with regard to FIG. 5A.

As shown in FIG. 5A, the UI 500A can further include a user interface control 516, which, when activated, is configured to show a user interface displaying relationship between topics shown in the topic field 504. FIG. 5C illustrates an exemplary topic relationship UI 500C. The UI 500C includes a topic relationship panel 532, which is configured to illustrate the topics 116 extracted from the documents 112. In the topic relationship panel 532, each topic 116 is identified by a circle 534. The size of the circle 534 corresponds to the overall topic proportion for the corresponding topic over the entire collection of the documents 112. A legend 536 indicates a mapping between circles with different sizes and their respectively represented proportions. It should be noted that the proportions for all the topics sum up to 100%. In another implementation, topic words contained in each of the topics can also be shown in the topic relationship panel 532. For example, the most frequent topic words in each of the topics can be shown inside or near the corresponding circle.

The topic relationship panel 532 can also be configured to illustrate similarity between topics. As discussed above, a topic can be defined mathematically as a distribution over a vocabulary. As such, a distance or a similarity between two topics can be defined using metrics that are utilized to measure the distance or similarity between two probability distributions, such as the Jensen-Shannon divergence. In the example shown in FIG. 5C, the distance between two circles is inversely proportional to the similarity between two topics. In another implementation, the distance between two circles can be made to be proportional to the similarity or distance between two topics. Demonstrating the similarity between topics can help a user to further explore the data. For example, after examining one topic, a user tends to check another topic that is dissimilar to the one he or she just examined.

When a user selects a circle in the topic relationship panel 532, a word distribution of the selected topic can be shown in a panel 538 of the UI 500C. All or most frequent words in the topic can be shown in a bar chart 546, represented by vertical bars with a grid pattern 542. The y-axis 544 of the chart 546 can correspond to the relative importance score $\gamma_{topic}$ of a word to the topic. In one configuration, the $\gamma_{topic}$ can be normalized to range from 0 to 100%. Various methods can be utilized to obtain the $\gamma_{topic}$. For example, the word distribution of a topic can be utilized to calculate the relative importance score $\gamma_{topic}$ of the words. Denote a topic, which is a distribution over words, using a topic vector $[p_1, p_2, \ldots, p_N]$, where each value of the vector corresponds to a word in the vocabulary and the sum of the values $p_1, p_2, \ldots, p_N$ equals to 1. The value for each word is proportional to the frequency the word is assigned to the topic. Based on this distribution vector, the $\gamma_{topic}$ of the $i^{th}$ word in the topic can be calculated as $(p_i - MIN_p)/(MAX_p - MIN_p)$, where $MIN_p$ is the minimum value in the topic vector and $MAX_p$ is the maximum value in the topic vector.

The chart 546 can also be configured to show the relative importance score $\gamma_{overall}$ of a word to the entire collection of documents 112, which is represented by the vertical bars 540 in FIG. 5C. The $\gamma_{overall}$ can be defined in a way similar to that described above for the $\gamma_{topic}$. Specifically, a distribution of words over the entire collection of documents 112 can be defined as $[q_1, q_2, \ldots, q_M]$ based on the overall word frequency. The $\gamma_{overall}$ of the $i^{th}$ word can be defined similarly as $(q_i - MIN_q)/(MAX_q - MIN_q)$, where $MIN_q$ and $MAX_p$ are the minimum value and the maximum value in the vector $[q_1, q_2, \ldots, q_M]$, respectively. By showing the relative importance score $\gamma_{topic}$ of a word to the topic and the relative importance score $\gamma_{overall}$ of a word to the entire collection of documents 112, a user can quickly identify unusual patterns. For example, in the selected topic extracted from the customer review documents 112, the words "batteries" and "love" are significant, but these two words are not so significant in the overall collection of the customer review documents 112. This suggests that one or more of the batteries products are well accepted by customers.

The above definition of the relative importance score $\gamma_{topic}$ of a word to the topic can be modified or changed to target various applications. For example, the value $p_i$ can be multiplied by a value that is proportional to the number of documents where the corresponding word is assigned to that topic. This definition is suitable in an application where a word is considered more important to a topic when it appears in more documents.

The UIs 500A and 500C provide a clear and concise overview of the topics 116 contained in the collection of documents 112. By looking at the UIs 500A and 500C, a user 124 can quickly identify the dominant topics discussed in the documents 112 and narrow down to individual documents 112 that contain those topics 116 for further analysis. For example, a manufacturer of products can be presented with a UI similar to the UIs 500A and 500C that summarizes the topics generated from a collection of customer reviews of its product. Through the UI, the manufacturer will be able to find out any problem associated with its products that are discussed by its customers, or any feature of their products that are attractive to its customers.

It should be understood that the UIs 500A and 500C are for illustration only, and should not be construed as limiting. Various other ways of presenting the topics 116 can be employed. For example, the topics 116 can be presented in a shape other than the rectangle box and the circle, such as a diamond, an oval, a triangle, or even a freeform shape. In addition to the color and background pattern, the topics can be distinguished through other aspects of the topic box, such as the pattern or the weight of the topic box border line.

Furthermore, additional information can be shown in the UIs 500A and 500C. For example, the frequency of the words in each topic can also be shown to assist the user 124 in determining the importance or predominance of the individual words. The frequency of a word can be shown as a subscript or a superscript of the word. The frequency of the word can also be presented through a size of the displayed word, with a larger size representing a higher frequency.

Figure 6:
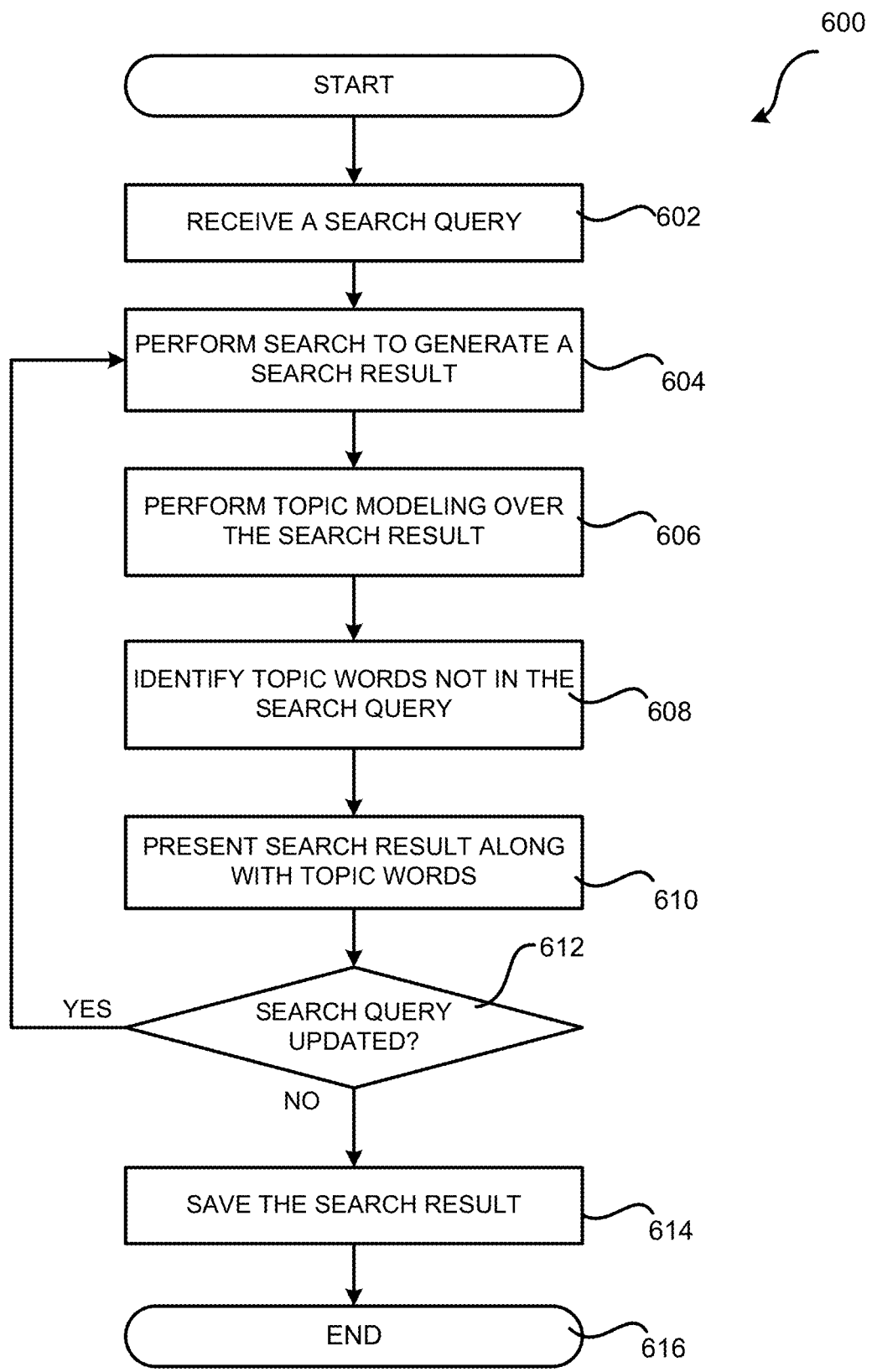
FIG. 6 is a flow diagram showing a routine that illustrates a method of utilizing topic modeling to enhance document search, according to one configuration disclosed herein.

In addition to presenting the generated topics 116 directly to a user 124 to facilitate document content analysis, the generated topics 116 can be used in various other applications, such as to enhance a document search experience. FIG. 6 is a flow diagram showing a routine 600 that illustrates aspects of a method of utilizing topic modeling to facilitate document search, according to one configuration disclosed herein. The routine 600 can be performed by a search engine that has a topic modeling module 108 executed thereon or is in communication with the topic modeling module 108.

The routine 600 begins at operation 602, where the search engine receives a search query from a user to search a collection of documents 112. The search query can include one or more search terms. The routine 600 then proceeds to operation 604, where the search engine can perform a search on the documents 112 to generate a search result including the documents that contain the search terms.

From operation 604, the routine 600 proceeds to operation 606, where the search engine can cause the topic modeling module 108 to perform topic modeling on the search result to generate topics that are contained in the documents of the search result. Any topic modeling technique can be employed in this operation to generate the topics 116, such as the progressive topic modeling described above, or the traditional LDA topic modeling.

The routine 600 then proceeds to operation 608, where words that are contained in the generated topics 116, but are not included in the search query can be identified. The routine 600 then proceeds to operation 610, where the identified topic words are presented to the user in a user interface along with the search result. These topic words can be presented as suggestions of search terms so that the user can include one or more of the suggested topic words in a further search. Additional aspects regarding the user interface for presenting the suggested topic words are provided below with regard to FIG. 7.

From operation 610, the routine 600 proceeds to operation 612, where it is determined whether the user has updated the search query, for example, by including one or more of the suggested topic words. If so, the routine 600 returns to operation 604, where a search is performed for the updated search query. The routine 600 then repeats operations 604-612 until no more search query updates are received. The routine 600 then proceeds to operation 614, where the latest search results are saved for the user. From operation 614, the routine 600 proceeds to operation 616, where it ends.

Figure 7:
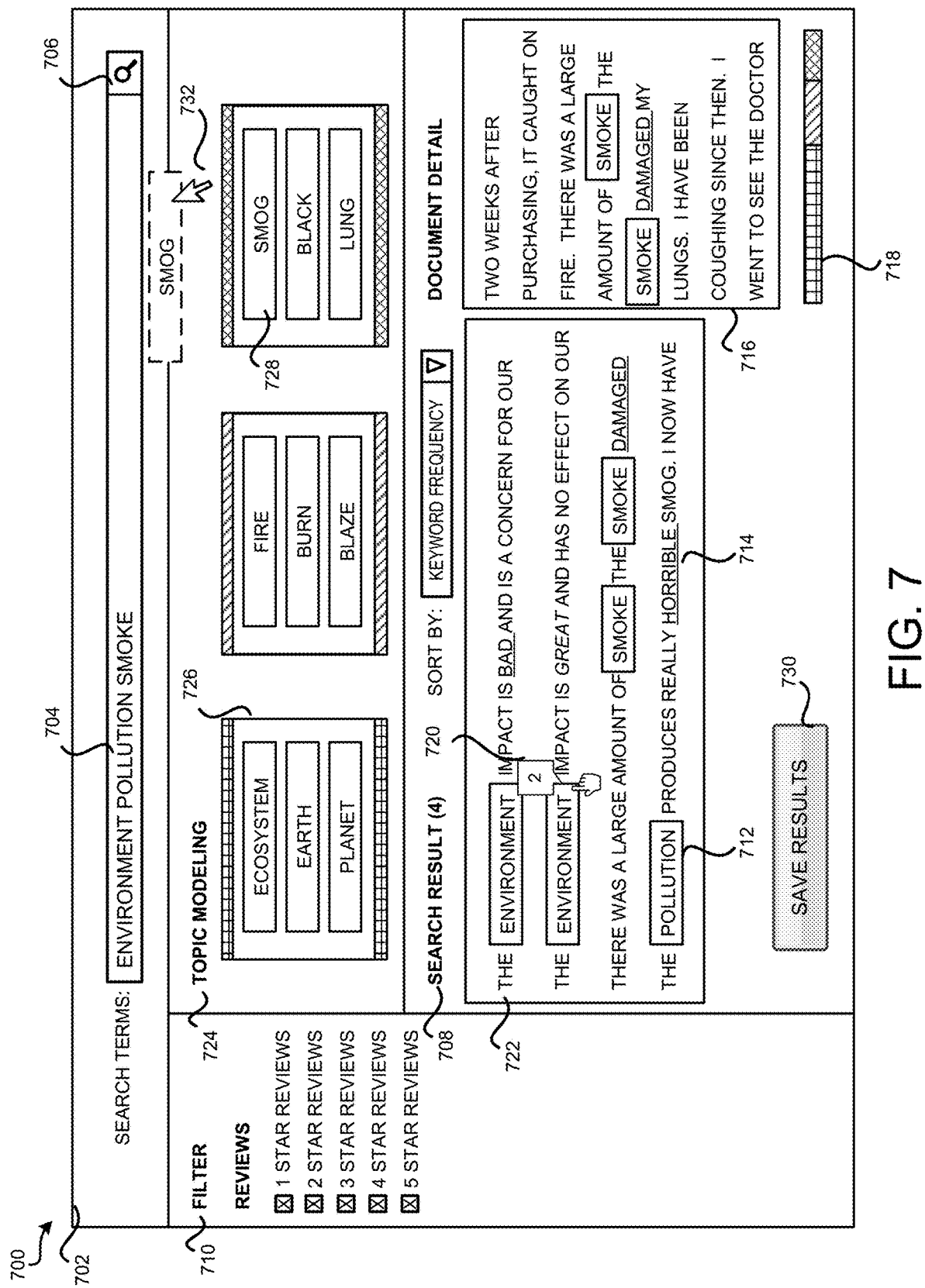
FIG. 7 is a screen diagram showing an exemplary user interface for utilizing topic modeling to enhance a document search experience, according to one configuration disclosed herein.

FIG. 7 is a screen diagram showing an exemplary UI 700 for utilizing topic modeling to enhance a document search experience, according to one configuration disclosed herein. The UI 700 includes a text field 704, which allows a user issuing a search query containing search terms input through the text field 704. The UI 700 also includes a search result panel 708 displaying documents contained in the search result generated by a search engine in response to the search query.

In the search result panel 708, a snippet 722 of each of the documents in the search results can be displayed. Search terms appearing in the snippets 722 can be highlighted, such as by drawing a box 712 around the search term as shown in FIG. 7. In addition, the frequency of a search term appearing in a document can also be presented in a hover box 720 when the user moves the pointer over the search term highlight box 712, such as with a mouse or a digital pen.

Words contained in the documents that reflect certain sentiments can also be highlighted in a different manner for words with different sentiments. For example, words having a negative sentiment can be highlighted through underlining, whereas words with a positive sentiment can be highlighted through italic or bold.

When one of the snippet 722 is selected, the entire content of the corresponding document can be displayed in a document field 716. Search terms and sentiment words can be highlighted in a way similar to that in the search result panel 708. The search results shown in the search result panel 708 can be filtered in various ways, such as by selecting a category filter in the filter panel 710. For example, for customer review documents, a filter based on the quantitative ratings contained in the customer reviews can be utilized to filter the search result to include reviews of certain ratings, such as 5-star rated reviews.

In one configuration, the UI 700 further includes a topic modeling panel 724 configured to presenting topic words 728 extracted from the documents shown in the search result panel 708. Words contained in one topic 116 are shown as one group 726. It can be seen from FIG. 7 that the space in the topic modeling panel 724 is generally limited. As such, only a small number of topic words 728 can be displayed in the topic modeling panel 724.

In one implementation, a search engine, or any other module responsible for generating the UI 700, can estimate the available space for displaying the topic words 728 in the topic modeling panel 724. The estimation can be made based on the intended display size of the topic modeling panel 724, the number of topics extracted, the importance of the words contained in each of the topic, the size of the display device, and the like. Based on the estimated available space, the search engine can determine a set of constraints on the topic words to be displayed in the topic modeling panel 724, such as the maximum number of the topics to be displayed, T, and the maximum number of topic words 728 to be displayed for each topic, M. Given these constraints, the search engine can select the topics and topic words to meet the display constraints. For example, the search engine can limit the number of the topics to be extracted to be lower than T, and for each topic, select the M most frequent words to be shown in the topic modeling panel 724.

The topic words can be presented as suggested search terms for the user to add into the search query. For example, the user can type the topic word 728 in the text field 704 to update the search query. The user can also drag and drop a word 728 into the text field 704 as illustrated by the mouse movement 732. The UI 700 can be implemented to allow the user to select a topic word 728 in other ways. The user can then click on the search button 706 to update the search result, which is then shown in the search result panel 708. Topics can then be generated for the updated search result, and the topic modeling panel 724 can be updated with the topic words of the updated topics.

The topic model generated for the documents in the search result can also be displayed in other formats in the UI 700 to provide further information to the user. For example, a distribution bar 718 can be displayed for the document shown in the document field 716 in a way similar to the distribution bar 514 presented in FIG. 5 to present the topic proportion for the document. Alternatively, a distribution bar can be presented for each of the documents shown in the search result panel 708. Further, different fonts, colors or sizes can be utilized to show the different topics in the document shown the document field 716. Once the user finishes the search, the user can save the search result along with other information, such as the topic model for the search result and sentiment words found in the search results, for later analysis.

As discussed above, each time the user updates the search query, the topic modeling can be performed on the new search result. Depending on the purpose of the analysis, different topic modeling techniques can be utilized to generate the new topic model. For example, if quick and light modeling is desired, such as to minimize the delay in extracting the topic model, to save computing resources, or to facilitate the trend analysis on the topics in the search result, the progressive topic modeling presented above with regard to FIGS. 1-4 can be utilized. In this case, documents that were not included in earlier search results can be treated as a new group of documents to refine the topic model. On the other hand, when time and resource consumption are not a concern, or when the user prefers to get topics that reflect the entire collection of documents in the new search result, the topic modeling can be performed afresh using the entire collection of documents.

It should be appreciated that while the topic modeling described above primarily focuses on the topic modeling over text-based documents, the topic modeling can be applied to other types of content, such as images, videos or audios. In some configurations, the images, videos or audios can be transformed into texts, upon which the topic modeling described above can be utilized. For example, object detection can be performed in images or videos to identify objects contained in the content, each of which can be considered as a word for the topic modeling purpose. Similarly, scene detection can be applied to video signals to detect violent scene, peaceful scene, natural scene, indoor, outdoor scene, and so on. Each of the detected scenes can be treated as a word. Also, special patterns, such as gradients or color distributions in an image or a video can also be considered as words in the topic modeling. Based on the detected words, the topic modeling described above can be performed on these multimedia content. For images that containing texts, or audios containing speech, optical character recognition ("OCR") and speech to text technologies can be utilized respectively to converting the original image and audio signal into text, where the topic modeling described above can be applied.

Figure 8:
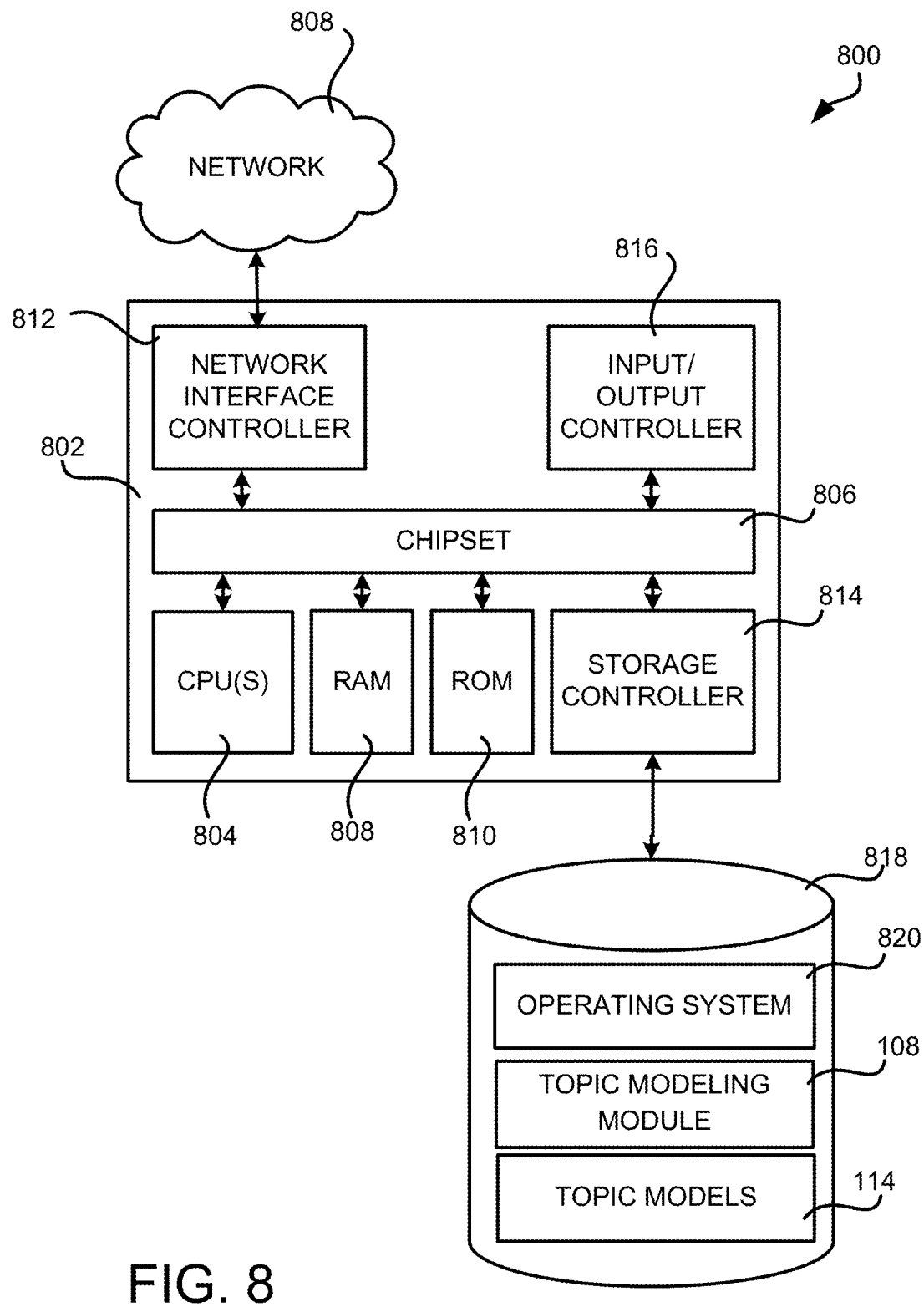
FIG. 8 is a computer architecture diagram showing an illustrative computer hardware architecture for implementing a computing device that can be utilized to implement aspects of the various technologies presented herein.

FIG. 8 shows an example computer architecture for a computer 800 capable of executing program components for implementing the functionality described above. The computer architecture shown in FIG. 8 illustrates a server computer, workstation, desktop computer, laptop, tablet, network appliance, e-reader, smartphone, or other computing device, and can be utilized to execute any of the software components presented herein.

The computer 800 includes a baseboard 802, or "motherboard," which is a printed circuit board to which a multitude of components or devices can be connected by way of a system bus or other electrical communication paths. In one illustrative configuration, one or more central processing units ("CPUs") 804 operate in conjunction with a chipset 806. The CPUs 804 can be standard programmable processors that perform arithmetic and logical operations necessary for the operation of the computer 800.

The CPUs 804 perform operations by transitioning from one discrete, physical state to the next through the manipulation of switching elements that differentiate between and change these states. Switching elements can generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 806 provides an interface between the CPUs 804 and the remainder of the components and devices on the baseboard 802. The chipset 806 can provide an interface to a RAM 808, used as the main memory in the computer 800. The chipset 806 can further provide an interface to a computer-readable storage medium such as a read-only memory ("ROM") 810 or non-volatile RAM ("NVRAM") for storing basic routines that help to startup the computer 800 and to transfer information between the various components and devices. The ROM 810 or NVRAM can also store other software components necessary for the operation of the computer 800 in accordance with the configurations described herein.

The computer 800 can operate in a networked environment using logical connections to remote computing devices and computer systems through a network, such as the network 808. The chipset 806 can include functionality for providing network connectivity through a NIC 812, such as a gigabit Ethernet adapter. The NIC 812 is capable of connecting the computer 800 to other computing devices over the network 808. It should be appreciated that multiple NICs 812 can be present in the computer 800, connecting the computer to other types of networks and remote computer systems.

The computer 800 can be connected to a mass storage device 818 that provides non-volatile storage for the computer. The mass storage device 818 can store an operating system 820, the topic modeling module 108, and the generated topic models 114, which have been described in greater detail herein. The mass storage device 818 can be connected to the computer 800 through a storage controller 814 connected to the chipset 806. The mass storage device 818 can consist of one or more physical storage units. The storage controller 814 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 800 can store data on the mass storage device 818 by transforming the physical state of the physical storage units to reflect the information being stored. The specific transformation of physical state can depend on various factors, in different implementations of this description. Examples of such factors can include, but are not limited to, the technology used to implement the physical storage units, whether the mass storage device 818 is characterized as primary or secondary storage, and the like.

For example, the computer 800 can store information to the mass storage device 818 by issuing instructions through the storage controller 814 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 800 can further read information from the mass storage device 818 by detecting the physical states or characteristics of one or more particular locations within the physical storage units.

In addition to the mass storage device 818 described above, the computer 800 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 800.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the mass storage device 818 can store an operating system 820 utilized to control the operation of the computer 800. According to one configuration, the operating system comprises the LINUX operating system. According to another configuration, the operating system comprises the WINDOWS® SERVER operating system from MICROSOFT CORPORATION. According to further configurations, the operating system can comprise the UNIX operating system or one of its variants. It should be appreciated that other operating systems can also be utilized. The mass storage device 818 can store other system or application programs and data utilized by the computer 800.

In one configuration, the mass storage device 818 or other computer-readable storage media is encoded with computer-executable instructions which, when loaded into the computer 800, transform the computer from a general-purpose computing system into a special-purpose computer capable of implementing the configurations described herein. These computer-executable instructions transform the computer 800 by specifying how the CPUs 804 transition between states, as described above. According to one configuration, the computer 800 has access to computer-readable storage media storing computer-executable instructions which, when executed by the computer 800, perform the various processes described above with regard to FIGS. 1-7. The computer 800 can also include computer-readable storage media for performing any of the other computer-implemented operations described herein.

The computer 800 can also include one or more input/output controllers 816 for receiving and processing input from a number of input devices, such as a keyboard, a mouse, a touchpad, a touch screen, an electronic stylus, or other type of input device. Similarly, an input/output controller 816 can provide output to a display, such as a computer monitor, a flat-panel display, a digital projector, a printer, a plotter, or other type of output device. It will be appreciated that the computer 800 might not include all of the components shown in FIG. 8, can include other components that are not explicitly shown in FIG. 8, or might utilize an architecture completely different than that shown in FIG. 8.

Embodiments of the disclosure can be described in view of the following clauses:

Clause 1: A computer-implemented method for content analysis based on progressive topic modeling over documents, the method comprising: accessing a plurality of documents; ordering the plurality of documents according to an attribute associated with the plurality of documents to form ordered documents; dividing the ordered documents into a plurality of groups; generating a first topic model by performing topic modeling on a first group of the documents based on a first vocabulary; obtaining a second group of documents; updating the first vocabulary for topic modeling to form an updated vocabulary; generating an updated topic model by performing topic modeling on a second group of the documents based on the first topic model and the updated vocabulary; and causing topics in the updated topic model to be presented in a user interface.

Clause 2: The computer-implemented method of clause 1, wherein the plurality of documents are ordered according to a time a corresponding document is created.

Clause 3: The computer-implemented method of clauses 1 and 2, wherein the second group of documents comprises new documents added to the plurality of documents.

Clause 4: The computer-implemented method of clauses 1-3, wherein the plurality of documents comprise customer reviews of products, and wherein the plurality of documents are ordered according to a quantitative rating contained in the customers reviews.

Clause 5: The computer-implemented method of clauses 1-4, wherein topics contained in the first topic model correspond to topics contained in the second topic model.

Clause 6: The computer-implemented method of clauses 1-5, wherein the updated topic model is presented in the user interface by presenting words contained in the updated topic model, and wherein the user interface is further configured to present a topic distribution for individual documents in the plurality of documents.

Clause 7: The computer-implemented method of clauses 1-6, wherein the topic modeling is performed utilizing latent Dirichlet allocation.

Clause 8: An apparatus, comprising: one or more processor; and one or more non-transitory computer-readable storage media having instructions stored thereupon which are executable by the one or more processors and which, when executed, cause the apparatus to: generate a first topic model by performing topic modeling on a plurality of documents based on a first vocabulary; obtain additional documents; update the first vocabulary for the topic modeling to form an updated vocabulary; and generate an updated topic model by performing topic modeling on the additional documents based on the first topic model and the updated vocabulary.

Clause 9: The apparatus of clause 8, wherein generating an updated topic model comprises updating the first topic model according to the updated vocabulary.

Clause 10: The apparatus of clauses 8-9, wherein updating the first vocabulary comprises: measuring a frequency of individual words that are contained in the plurality of documents or the additional document; calculating a vocabulary metric for individual ones of the words based on the frequency of a corresponding word; removing words in the first vocabulary that have a vocabulary metric less than a pre-determined threshold; and adding words to the first vocabulary that have a vocabulary metric higher than a pre-determined threshold.

Clause 11: The apparatus of clauses 8-10, wherein the vocabulary metric for a word is calculated as a weighted sum of the frequency of the word appearing in the plurality of document and the frequency of the word appearing in the additional documents.

Clause 12: The apparatus of clauses 8-11, wherein topics contained in the first topic model correspond to topics contained in the updated topic model.

Clause 13: The apparatus of clauses 8-12, wherein the topic modeling is performed utilizing latent Dirichlet allocation.

Clause 14: A non-transitory computer-readable storage media having instructions stored thereupon which are executable by one or more processors and which, when executed, cause the one or more processors to: generate a first topic model by performing topic modeling on a plurality of documents based on a first vocabulary; obtain additional documents; update the first vocabulary for the topic modeling to form an updated vocabulary; generate an updated topic model by performing topic modeling on the additional documents based on the first topic model and the updated vocabulary; and cause a user interface to be generated to present the updated topic model.

Clause 15: The non-transitory computer-readable storage media of clause 14, wherein generating an updated topic model comprises updating the first topic model according to the updated vocabulary.

Clause 16: The non-transitory computer-readable storage media of clauses 14-15, wherein the plurality of documents comprise customer reviews of products, and wherein the additional documents comprise customers reviews received after the plurality of documents are received.

Clause 17: The non-transitory computer-readable storage media of clauses 14-16, wherein the plurality of documents comprise words extracted from a multimedia signal, the multimedia signal comprising one or more of an image signal, an audio signal or a video signal.

Clause 18: The non-transitory computer-readable storage media of clauses 14-17, wherein topics contained in the first topic model correspond to topics contained in the updated topic model.

Clause 19: The non-transitory computer-readable storage media of clauses 14-18, wherein updating the first vocabulary comprises: measuring a frequency of individual words that are contained in the plurality of documents or the additional document; calculating a vocabulary metric for individual ones of the words based on the frequency of a corresponding word; removing words in the first vocabulary that have a vocabulary metric less than a pre-determined threshold; and adding words to the first vocabulary that have a vocabulary metric higher than a pre-determined threshold.

Clause 20: The non-transitory computer-readable storage media of clauses 14-19, wherein the vocabulary metric for a word is calculated as a weighted sum of the frequency of the word appearing in the plurality of document and the frequency of the word appearing in the additional documents.

Clause 21: A computer-implemented method for facilitating document search based on topic modeling, the method comprising: causing a display device to present a search section in a user interface, the search section configured to receive a search query and initiate a search on a collection of documents based on the search query; causing the display device to present a topic modeling section adjacent to the search section in the user interface, the topic modeling section configured to present one or more topics extracted through topic modeling from one or more documents in search results generated based on the search query; causing the display device to present a search result section adjacent to the topic modeling section in the user interface, the search result section configured to present the search results that comprise the one or more documents that satisfy the search query; receiving, from a user input device, user input indicating a user selection from the one or more topics presented in the topic modeling section of at least one of the topics and addition of the at least one of the topics to the search query in the search section to thereby form an updated search query; and in response to receiving the updated search query, initiating another search in the collection of documents based on the updated search query, receiving updated search results, updating the one or more topics based on the updated search results, causing the display device to present the updated search results in the search result section, and causing the display device to present the updated topics in the topic modeling section.

Clause 22: The computer-implemented method of clause 21, wherein the one or more topics comprise a plurality of topic words, and wherein presenting the one or more topics comprises presenting one or more of the plurality of topic words.

Clause 23: The computer-implemented method of clauses 21-22, wherein presenting the one or more topics comprises presenting one or more of the plurality of topic words that are not contained in the search query.

Clause 24: The computer-implemented method of clauses 21-23, wherein the updated search query contains at least one topic word displayed in the topic modeling section.

Clause 25: The computer-implemented method of clauses 21-24, wherein presenting the one or more of the plurality of topic words comprises: determining a size of the topic modeling section in the user interface based at least in part upon a size of the display device; determining a maximum number of topic words that can be presented in the topic modeling section based on the size of the topic modeling section; selecting the one or more topic words from the plurality of topic words such that a number of the selected topic words does not exceed the maximum number of topic words; and presenting the selected topic words in the topic modeling section in the user interface.

Clause 26: The computer-implemented method of clauses 21-25, wherein the user interface is configured to enable the addition of the at least one of the topics to the search query to be performed by dragging and dropping a topic word of the at least one of the topics from the topic modeling section to the search section.

Clause 27: A non-transitory computer-readable storage media having instructions stored thereupon that are executable by one or more processors and which, when executed, cause the one or more processors to: cause a user interface for searching a collection of documents to be presented; receive a search query via the user interface; generate a search result by performing a search in the collection of documents based on the search query, the search result comprising one or more documents that satisfy the search query; extract one or more topics from the one or more documents through topic modeling, the one or more topics comprising a plurality of topic words; cause one or more of the plurality of topic words to be presented in the user interface as suggested topic words; receive a selection of at least one of the suggested topic words through the user interface; update the search result to generate an updated search result by performing another search in the collection of documents based on an updated search query that comprises the search query and the at least one of the suggested topic words; and cause the updated search result to be presented in the user interface.

Clause 28: The non-transitory computer-readable storage media of clause 27, wherein presenting one or more of the plurality of topic words in the user interface as suggested topic words comprises: determining a size of a portion of the user interface for presenting the suggested topic words; determining a maximum number of topic words that can be presented in the portion of the user interface based on the size of the portion of the user interface; selecting the suggested topic words from the plurality of topic words such that a number of the suggested topic words does not exceed the maximum number of topic words; and causing the suggested topic words to be presented in the portion of the user interface.

Clause 29: The non-transitory computer-readable storage media of clause 27-28, having further instructions stored thereupon to: extract topics from the updated result to form extracted topics; and cause one or more topic words of the extracted topics that are not included in the updated search query to be presented in the user interface.

Clause 30: The non-transitory computer-readable storage media of clause 27-29, wherein extracting topics from the updated result is performed via topic modeling based on topic models generated from the previous search result and additional documents included in the updated search result.

Clause 31: The non-transitory computer-readable storage media of clause 27-30, wherein extracting topics from the updated search result is performed via topic modeling on documents included in the updated search result.

Clause 32: The non-transitory computer-readable storage media of clause 27-31, wherein the user interface is configured to allow the selection of a suggested topic word to be performed by dragging a user interface control representing the suggested topic word and dropping the user interface control to an input field of the user interface configured for entering the search query.

Clause 33: The non-transitory computer-readable storage media of clauses 27-32, wherein the suggested topic words presented in the user interface are organized based on respective topics that the suggested topic words belong to.

Clause 34: A computer-implemented method for presenting topic models extracted from a collection of documents, the method comprising: generating a plurality of topics by performing a topic modeling process on a collection of documents, individual ones of the plurality of topics comprising a plurality of topic words; causing the plurality of topics to be presented in a user interface by displaying the plurality of topic words in the user interface; receiving a selection of a topic among the plurality of topics displayed in the user interface; and in response to receiving the selection of the topic, causing additional information associated with the topic to be presented in the user interface.

Clause 35: The computer-implemented method of clause 34, further comprising: receiving a change to a configuration of the topic modeling process through the user interface; in response to receiving the change to the configuration, performing the topic modeling process utilizing the configuration with the change received through the user interface to generate updated topics; and replacing the topics presented in the user interface with the updated topics.

Clause 36: The computer-implemented method of claim 34-35, wherein the configuration of the topic modeling process comprises one or more of a number of topics to be output by the topic modeling processing, a number of iterations to be executed during the topic modeling processing, or a set of stop words used in the topic modeling process.

Clause 37: The computer-implemented method of clause 34-36, wherein the change to the configuration is received through a user interface configured to receive changes to the configuration.

Clause 38: The computer-implemented method of clause 34-37, further comprising: determining a topic proportion of a topic over the collection of documents; and causing a size of a user interface object representing the topic in the user interface to be proportional to the topic proportion of the topic.

Clause 39: The computer-implemented method of clauses 34-38, further comprising: calculating a distance between two topics; and causing a distance between user interface objects representing the two topics in the user interface to reflect the distance between the two topics.

Clause 40: The computer-implemented method of clauses 34-39, wherein the additional information associated with the topic comprises one or more of a portion of a document containing the selected topic or an importance score of topic words contained in the selected topic.

Based on the foregoing, it should be appreciated that technologies for topic modeling over a set of documents to facilitate document content analysis have been presented herein. Moreover, although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and media are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes can be made to the subject matter described herein without following the example configurations and applications illustrated and described, and without departing from the true spirit and scope of the present invention, which is set forth in the following claims.

What is claimed is:

1. A computer-implemented method for facilitating document search based on topic modeling, the method comprising:
   causing a display device to present a search section in a user interface, the search section configured to receive a search query and initiate a search on a collection of documents based on the search query;
   causing the display device to present the topic modeling section adjacent to the search section in the user interface, the topic modeling section configured to present one or more topics comprising one or more of a plurality of topic words extracted through topic modeling from one or more documents in search results generated based on the search query wherein presenting the one or more of a plurality of topic words comprises:
      determining dimensions of a topic modeling section in the user interface;
      determining a maximum number of topic words that can be presented in the topic modeling section based on the dimensions of the topic modeling section;
      selecting the one or more topic words from the plurality of topic words such that a number of the selected topic words does not exceed the maximum number of topic words; and
   causing the display device to present the selected topic words in the topic modeling section in the user interface;
   causing the display device to present a search result section adjacent to the topic modeling section in the user interface, the search result section configured to present the search results that comprise the one or more documents that satisfy the search query;
   receiving, from a user input device, user input indicating a user selection from the one or more topics presented in the topic modeling section of at least one of the topics and addition of the at least one of the topics to the search query in the search section to thereby form an updated search query; and
   in response to receiving the updated search query,
      initiating another search in the collection of documents based on the updated search query,
      receiving updated search results,
      updating the one or more topics based on the updated search results,
      causing the display device to present the updated search results in the search result section, and
      causing the display device to present the updated topics in the topic modeling section.

2. The computer-implemented method of claim 1, wherein presenting the one or more topics comprises presenting one or more of the plurality of topic words that are not contained in the search query.

3. The computer-implemented method of claim 2, wherein the updated search query contains at least one topic word displayed in the topic modeling section.

4. The computer-implemented method of claim 2, further comprising:
   causing to be presented in the user interface a window configured to receive a selection of one or more stop words filtered from the updated search results.

5. The computer-implemented method of claim 1, wherein the user interface is configured to enable the addition of the at least one of the topics to the search query to be performed by dragging and dropping a topic word of the at least one of the topics from the topic modeling section to the search section.

6. The computer-implemented method of claim 1, wherein the one or more documents comprise at least one of customer reviews of products or services, blogs posted by blog authors, or news articles written by reporters reporting events.

7. The computer-implemented method of claim 1, wherein causing the display device to present the updated topics comprises performing topic modeling on two or more sets of documents and the extracted topics are contained in one set of the one or more documents but not the second set of the one or more documents.

8. A non-transitory computer-readable storage media having instructions stored thereupon that are executable by one or more processors and which, when executed, cause the one or more processors to:
   cause a user interface for searching a collection of documents to be presented;
   receive a search query via the user interface;
   generate a search result by performing a search in the collection of documents based on the search query, the search result comprising one or more documents that satisfy the search query;
   extract one or more topics from the one or more documents through topic modeling, the one or more topics comprising a plurality of topic words;

cause one or more of the plurality of topic words to be presented in the user interface as suggested topic words wherein causing one or more of the plurality of topic words to be presented in the user interface comprises:
    determining dimensions of a portion of the user interface for presenting the suggested topic words;
    determining a maximum number of topic words that can be presented in the portion of the user interface based on the dimensions of the portion of the user interface;
    selecting the suggested topic words from the plurality of topic words such that a number of the suggested topic words does not exceed the maximum number of topic words; and
    causing the suggested topic words to be presented in the portion of the user interface;
receive a selection of at least one of the suggested topic words through the user interface;
update the search result to generate an updated search result by performing another search in the collection of documents based on an updated search query that comprises the search query and the at least one of the suggested topic words; and
cause the updated search result to be presented in the user interface.

9. The non-transitory computer-readable storage media of claim 8, having further instructions stored thereupon to:
    extract topics from the updated search result to form extracted topics; and
    cause one or more topic words of the extracted topics that are not included in the updated search query to be presented in the user interface.

10. The non-transitory computer-readable storage media of claim 9, wherein extracting topics from the updated search result is performed via topic modeling based on topic models generated from the previous search result and additional documents included in the updated search result.

11. The non-transitory computer-readable storage media of claim 9, wherein extracting topics from the updated search result is performed via topic modeling on documents included in the updated search result.

12. The non-transitory computer-readable storage media of claim 8, wherein the user interface is configured to allow the selection of a suggested topic word to be performed by dragging a user interface control representing the suggested topic word and dropping the user interface control to an input field of the user interface configured for entering the search query.

13. The non-transitory computer-readable storage media of claim 8, wherein the suggested topic words presented in the user interface are organized based on respective topics that the suggested topic words belong to.

14. The non-transitory computer-readable storage media of claim 8, further comprising:
    causing to be presented in the user interface a window configured to receive a selection of one or more stop words filtered from the updated search results.

15. A computer-implemented method for presenting topic models extracted from a collection of documents, the method comprising:
    generating a plurality of topics by performing a topic modeling process on a collection of documents, individual ones of the plurality of topics comprising a plurality of topic words;
    causing the plurality of topics to be presented in a user interface by displaying the plurality of topic words in the user interface;
    receiving a selection of a topic among the plurality of topics displayed in the user interface;
    in response to receiving the selection of the topic, causing additional information associated with the topic to be presented in the user interface;
    receiving a change to a configuration of the topic modeling process through the user interface, wherein the configuration of the topic modeling process comprises one or more of a number of topics to be output by the topic modeling process, a number of iterations to be executed during the topic modeling process, or a set of stop words used in the topic modeling process;
    in response to receiving the change to the configuration, performing the topic modeling process utilizing the configuration with the change received through the user interface to generate updated topics; and
    replacing the topics presented in the user interface with the updated topics.

16. The computer-implemented method of claim 15, wherein the change to the configuration is received through a user interface configured to receive changes to the configuration.

17. The computer-implemented method of claim 15, further comprising:
    determining a topic proportion of a topic over the collection of documents; and
    causing a size of a user interface object representing the topic in the user interface to be proportional to the topic proportion of the topic.

18. The computer-implemented method of claim 15, further comprising:
    calculating a distance between two topics; and
    causing a distance between user interface objects representing the two topics in the user interface to reflect the distance between the two topics.

19. The computer-implemented method of claim 15, wherein the additional information associated with the topic comprises one or more of a portion of a document containing the selected topic or an importance score of topic words contained in the selected topic.

20. The computer-implemented method of claim 15, further comprising:
    causing to be presented in the user interface a window configured to receive a selection of one or more stop words filtered from the search results.

* * * * *